(12) United States Patent
Gay

(10) Patent No.: US 8,447,820 B1
(45) Date of Patent: May 21, 2013

(54) DATA AND EVENT SYNCHRONIZATION ACROSS DISTRIBUTED USER INTERFACE MODULES

(75) Inventor: Ryan Patrick Gay, Arlington, VA (US)

(73) Assignee: Decision Lens, Inc., Arlington, VA (US)

( * ) Notice: Subject to any disclaimer, the term of this patent is extended or adjusted under 35 U.S.C. 154(b) by 223 days.

(21) Appl. No.: 13/015,754

(22) Filed: Jan. 28, 2011

(51) Int. Cl.
*G06F 15/16* (2006.01)

(52) U.S. Cl.
USPC ........... 709/206; 709/212; 709/248; 709/217; 709/223

(58) Field of Classification Search ............... 709/203, 709/206, 213, 216, 219, 231–232, 248
See application file for complete search history.

(56) References Cited

U.S. PATENT DOCUMENTS

| | | |
|---|---|---|
| 5,844,817 A | 12/1998 | Lobley et al. |
| 6,151,565 A | 11/2000 | Lobley et al. |
| 6,502,126 B1 | 12/2002 | Pendakur |
| 6,643,645 B1 | 11/2003 | Fayyad et al. |
| 6,785,709 B1 | 8/2004 | Pendakur |
| 6,850,891 B1 | 2/2005 | Forman |
| 6,882,989 B2 | 4/2005 | Stevens |
| 6,907,566 B1 | 6/2005 | McElfresh et al. |
| 6,963,901 B1 | 11/2005 | Bates et al. |
| 7,080,071 B2 | 7/2006 | Henrion et al. |
| 7,203,755 B2 | 4/2007 | Zhu et al. |
| 7,257,566 B2 | 8/2007 | Danielson et al. |
| 7,353,253 B1 | 4/2008 | Zhao |
| 7,398,257 B2 | 7/2008 | Kaji |
| 7,542,952 B2 | 6/2009 | Yang et al. |
| 7,552,104 B2 | 6/2009 | Hansen et al. |
| 7,624,069 B2 | 11/2009 | Padgette |
| 7,689,592 B2 | 3/2010 | Denton et al. |
| 7,716,360 B2 * | 5/2010 | Angelov ....................... 709/231 |
| 7,827,239 B2 | 11/2010 | Bodin et al. |
| 7,844,670 B2 | 11/2010 | Roskowski et al. |
| 7,996,344 B1 | 8/2011 | Goel |
| 8,239,338 B1 | 8/2012 | Adams et al. |
| 8,250,007 B2 | 8/2012 | Abido et al. |
| 8,315,971 B1 | 11/2012 | Adams et al. |
| 2001/0027455 A1 | 10/2001 | Abulleil et al. |
| 2003/0069868 A1 | 4/2003 | Vos |

(Continued)

FOREIGN PATENT DOCUMENTS

| | | |
|---|---|---|
| WO | WO 01/08070 A1 | 2/2001 |
| WO | WO 01/20530 | 3/2001 |
| WO | WO 2008/057178 | 5/2008 |
| WO | WO 2009/026589 A3 | 2/2009 |

OTHER PUBLICATIONS

U.S. Appl. No. 12/646,099, filed Dec. 23, 2009, Adams.
U.S. Appl. No. 12/646,289, filed Dec. 23, 2009, Adams.

(Continued)

*Primary Examiner* — Andrew Lai
*Assistant Examiner* — Zhiren Qin
(74) *Attorney, Agent, or Firm* — Posz Law Group, PLC

(57) ABSTRACT

A computer includes, among other things, local modules contained within a module container of a same application; a message producer unit to communicate with a data server over the i/o interface; a message consumer unit configured to communicate with the data server over the i/o interface; and a local event manager unit. There is a pre-defined sequence of processing events between the local event manager unit, the local modules within the same application of the same module container, remote modules, the message producer unit, and the message consumer unit.

23 Claims, 15 Drawing Sheets

U.S. PATENT DOCUMENTS

| | | | |
|---|---|---|---|
| 2003/0191726 A1 | 10/2003 | Kirshenbaum | |
| 2003/0208514 A1 | 11/2003 | Yang et al. | |
| 2004/0103058 A1 | 5/2004 | Hamilton | |
| 2006/0195441 A1 | 8/2006 | Julia et al. | |
| 2006/0224530 A1 | 10/2006 | Riggs et al. | |
| 2006/0241950 A1 | 10/2006 | Hansen et al. | |
| 2007/0226295 A1* | 9/2007 | Haruna et al. | 709/204 |
| 2008/0103880 A1 | 5/2008 | Saaty | |
| 2008/0104058 A1 | 5/2008 | Billmaier et al. | |
| 2008/0250110 A1 | 10/2008 | Zhao | |
| 2008/0256054 A1 | 10/2008 | Saaty | |
| 2010/0153920 A1 | 6/2010 | Bonnet | |
| 2010/0318606 A1 | 12/2010 | Sethi et al. | |
| 2011/0022556 A1 | 1/2011 | Adams | |
| 2012/0053973 A1 | 3/2012 | Elazouni et al. | |
| 2012/0133727 A1 | 5/2012 | Bolduc et al. | |

OTHER PUBLICATIONS

U.S. Appl. No. 12/646,312, filed Dec. 23, 2009, Adams.
U.S. Appl. No. 12/646,418, filed Dec. 23, 2009, Adams.
Condon et al., "Visualizing group decisions in the analytic hierarchy process," *Computers & Operation Research*, (2003), 30, p. 1435-1445.
D. Saaty et al., "The Future of the University of Pittsburgh Medical Center: Strategic Planning with the Analytic Network Process," Proceedings of the Fourth International Symposium on the Analytic Hierarchy Process, (Jul. 12-15, 1996), p. 107-121.
U.S. Appl. No. 13/290,423, filed Nov. 7, 2011, Adams.
U.S. Appl. No. 13/294,369, filed Nov. 11, 2011, Adams.
Wolfslehner, Bernhard, Vacik, Harald, Lexer, Manfred; "Application of the analytic network process in multi-criteria analysis of sustainable forest management", Forest Ecology and Management, Mar. 2005, pp. 157-170.
Office Action issued by the U.S. Patent Office on Mar. 15, 2012 in connection with related U.S. Appl. No. 12/646,099.
Notice of Allowance issued by the U.S. Patent Office on Apr. 17, 2012 in connection with related U.S. Appl. No. 12/646,099.
Demirtas et al., "An integrated multiobjective decision making process for supplier selection and order allocation", Department of Industrial Engineering, Osmangazi University, 26030 Eskisehir, Turkey, Available online Feb. 28, 2006.
Tuzkaya et al., "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.
Adams et al., "Super Decisions Software Guide", Copyright c 1999/2003 Thomas L. Saaty (The software for the Analytic Network Process for decision making with dependence and feedback was developed by William Adams in 1999-2003).
Neaupane et al., "Analytic network process model for landslide hazard zonation", Civil Engineering Program, Sirindhorn Int. Ins. Of Technology, Thammasat University, Thailand, Available online May 2, 2008.
T.L. Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.
R.W. Saaty, "Validation Examples for the Analytic Hierarchy Process and Analytic Network Process", MCDM 2004, Whistler, B. C. Canada Aug. 6-11, 2004.
Saaty, Thomas L., "The Analytic Hierarchy and Analytic Network Measurement Processes: Applications to Decisions under Risk", University of Pittsburgh, Pittsburgh, PA 15260, USA, on year 2008.
Office Action issued by the U.S. Patent Office on May 29, 2012 in connection with related U.S. Appl. No. 12/646,418.
Office Action issued by the U.S. Patent Office on Jul. 18, 2012 in connection with related U.S. Appl. No. 12/508,703.
Notice of Allowance issued by the U.S. Patent Office on Aug. 1, 2012 in connection with related U.S. Appl. No. 12/646,418.
Office Action issued by the U.S. Patent Office on Aug. 6, 2012 in connection with realted U.S. Appl. No. 12/646,289.
Office Action issued by the U.S. Patent Office on Aug. 10, 2012 in connection with realted U.S. Appl. No. 12/646,312.
Notice of Allowance issued by the U.S. Patent Office on Aug. 31, 2012 in connection with related U.S. Appl. No. 12/508,703.
Office Action issued by the U.S. Patent Office on Aug. 5, 2008 in connection with related U.S. Appl. No. 11/586,557.
Office Action issued by the U.S. Patent Office on Apr. 14, 2009 in connection with related U.S. Appl. No. 11/586,557.
Office Action issued by the U.S. Patent Office on Apr. 13, 2009 in connection with related U.S. Appl. No. 11/783,436.
Office Action issued by the U.S. Patent Office on Oct. 21, 2009 in connection with related U.S. Appl. No. 11/783,436.
Notification of Transmittal of the International Search Report and the Written Opinion of the International Searching Authority mailed Aug. 25, 2008 in corresponding PCT application No. PCT/US2007/022184.
Notification of Transmittal of the International Preliminary Report on Patentability mailed May 7, 2009 in corresponding PCT application No. PCT/US2007/022184.
Super Decisions Software for Decision Making, Super Decisions Website, (http://web.archive.org/web/20041202040911/http://www.superdecisions.com/ and http://www.superdecisions.com/~saaty/), 2004.
The Super Decisions Software, The Essentials of the Analytic Network Process with Seven Examples, Decision Making with Dependence and Feedback, (http://www.superdecisions.com/~saaty/Fall2005DecisionClass/PowerpointSlides/), Sep. 2005.
The Super Decisions Software, The Analytic Network Process for Decision Making with Dependence and Feedback lecture 2, Tutorial ANP BOCR (http://www.superdecisions/~saaty/Fall2005DecisionClass/PowerpointSlides/) Sep. 2005.
Decision Lens Inc., Decision Lens's Decision Lens Suite™ Product, (http://web.archive.org/web/20050204181100/www.decisionlens.com/index.php), 2004-2005.
Caterinicchia, Dan, "A problem-solving machine," *Federal Computer Week*, (Sep. 4, 2000), 14, 31, p. 48-49.
The Super Decisions Software, The Analytic Network Process, Decision Making with Dependence and Feedback, (http://www.superdecisions.com/~saaty/Fall2005DecisionClass/PowerpointSlides/), Sep. 2005.
Mikhailov et al., "Fuzzy Analytic Network Process and its Application to the Development of Decision Support Systems," IEEE Transactions on Systems, Man, and Cybernetics—Part C: Applications and Reviews, (Feb. 2003), vol. 33, No. 1, p. 33-41.
Decision Lens, Inc., Tutorial on Hierarchical Decision Models (AHP), 2002.
Decision Lens, Inc., Tutorial on Complex Decision Models (ANP), 2002.
Rozann W. Saaty., Decision Making in Complex Environments: The Analytic Network Process (ANP) for Dependence and Feedback Including a Tutorial for the SuperDecisions Software and Portions of the Encyclicon of Application, Dec. 2002.
Rozann W. Saaty., Decision Making in Complex Environments: The Analytic Network Process (ANP) for Dependence and Feedback Including a Tutorial for the SuperDecisions Software and Portions of the Encyclicon of Application, 2005.
Decision Lens, Inc., *MS_Help_Decision_Lens*. "Welcome to Decision Lens Software™," Jun. 6, 2005.
Team Acuity, SAGD ANP Enhancement Functional Requirements Document, (Dec. 15, 2007), p. 1-68.
Decision Lens, Inc., *DLE_Help File*, Dec. 2007.
Decision Lens, Inc., *DLS_Help File*, Dec. 2007.
H. Sun., "AHP in China," International Symposium on the Analytic Hierarchy Process, (Jul. 8-10, 2003), p. 1-21.
Thomas L. Saaty., "Decision-Making with the AHP: Why is the Principal Eigenvector Necessary," International Symposium on the Analytic Hierarchy Process, (Aug. 2-4, 2001), p. 1-14.
Thomas L. Saaty., "The Analytic Network Process: Dependence and Feedback in Decision Making (Part 1) Theory and Validation Examples," International Symposium on the Analytic Hierarchy Process, (Aug. 6-11, 2004), p. 1-10.

Davolt, Steve, "The man who knew too much," *Washington Business Journal*, (Aug. 7, 2007), (http://www.bizjournals.com/washington/stories/2000/08/07/smallbl.html?t=printable).

Roxann Saaty et al., "Decision Making in complex environments," Super Decisions, 2003.

Feglar et al., "Dynamic Analytic Network Process: Improving Decision Support for Information and Communication Technology," ISAHP, Honolulu, Hawaii, (Jul. 8-10, 2003).

Borenstein et al., "A Multi-Criteria Model for the Justification of IT Investments," (Feb. 2005), INFOR v3n1, Canadian Operational Research Society, p. 1-21.

Liming Zhu, et al., "Tradeoff and Sensitivity Analysis in Software Architecture Evaluation Using Analytic Hierarchy Process," *Software Quality Journal*, (2005), vol. 13, p. 357-375.

* cited by examiner

DATA AND EVENT SYNCHRONIZATION ACROSS DISTRIBUTED USER INTERFACE MODULES

TECHNICAL FIELD

The technology relates in general to computer networks, and more specifically to synchronizing distributed independent application modules, optionally on remote computers, for performance of a coordinated user experience.

TECHNICAL BACKGROUND

Web-based application modules may be used to conduct live meetings, training, education, and/or presentations via a computer network, such as the Internet. In some web-based application techniques, each participant in the meeting or the like sits at his or her own computer and is connected to other participants via the Internet. The web-based application can be, for example, a downloaded application executing on each of the users' computers or a remote application where the attendees access the meeting by clicking on a link distributed by a meeting invitation e-mail to enter the meeting.

A feature that web-based collaboration applications sometimes offers is referred to as "screen sharing", "desktop sharing", or "application sharing," where participants can view what a presenter currently has shown on their screen. Some screen sharing applications allow for remote desktop control, allowing participants to manipulate the presenter's screen.

Nevertheless, existing software solutions can be inadequate when data is actively modified and/or when users are actively switching between application modules, and when user interfaces should be coordinated. Interactive data presentation and/or user control of user interfaces can easily become de-synchronized, or can slow down due to untimely attempts to synchronize activity.

So-called decision support systems (DSS), that help users compile information and structure a decision model to identify and solve problems and make decisions, present a further challenge. This type of software includes a knowledge database, a decision model (e.g., a decision context and decision criteria), and one or more user interfaces. Typically voting on a decision in a DSS can be remote, but a DSS typically does not have application sharing due to the data-intensive nature of use.

SUMMARY

Accordingly, one or more embodiments provide a computer system, including an i/o interface operable to transmit and receive communications over at least a portion of a communication network; and a processor cooperatively operable with the i/o interface. The processor is configured with local modules contained within a module container of a same application; a message producer unit to communicate with a data server over the i/o interface; a message consumer unit configured to communicate with the data server over the i/o interface; and a local event manager unit. The local event manager unit dispatches an event to all of the local modules within the same application of the same module container, and passes the event to the message producer unit, when the event is received by the local event manager unit from one of the local modules executing within the module container or from the module container to represent a user control action within the one of the local modules or the container for the local modules; and the local event manager unit dispatches a local event to the local modules as the event when a remote event is received from the message consumer unit, the remote event being generated by one of other applications outside the module container that need to stay synchronized with the local modules. The message producer unit transmits the event to the data server as a message configured to communicate the event to the other applications outside the module container that need to stay synchronized with the local modules, when the event is received from the local event manager unit. The message consumer unit transmits the remote event to the local event manager unit, when the message consumer unit receives the message configured to communicate the remote event from the data server. Each of the local modules determines to not cache the event for the local module when the local module is active, and to cache the event when the local module is not active, when the local module receives the event from the local event manager unit. The local module acts on the event instead of storing the event for later action, when the determination is to not cache the event; and the local module stores the event in an event cache per the local module for later action, when the determination is to cache the event.

According to another aspect, the local module acts on each event in its event cache using the same action for cached events as for events which were not cached.

According to still another aspect, the message consumer unit transmits a data event to the local event manager unit, when the message consumer unit receives a message configured to communicate the data event from the data server, the data event representing a modification of data at the data server by the one of the other applications outside the module container that need to stay synchronized with the local modules.

According to yet a further aspect, the local module determines to not cache the event, when the module is in interactive mode on a user interface within the module container; and determines to cache the event, when the module is in a background of the user interface within the module container.

According to still a further aspect, the local module determines whether one or more of other events stored in the event cache of the local module is to be overridden by the event, and evicts the one or more of the other events stored in the event cache when the one or more of the other events is to be overridden, when the local module determines to cache the event.

According to another aspect, the local module acts on all events stored in the cache for the local module, when a user control event activates the local module within the module container.

And, according to still another aspect, the same application is a web-distributed application that supports multiple simultaneous users each operating separate module containers with local modules that are the other applications outside the module container that need to stay synchronized.

In accordance with another aspect, there is provided a computer-implemented method, for synchronizing plural independent applications. In accordance with yet another aspect, there is provided an apparatus configured to perform the method for synchronizing plural independent applications. According to still another aspect, there is provided a computer readable medium comprising executable instructions for performing the method for synchronizing plural independent applications. Also, according to another aspect, there is provided a computer-readable non-transitory medium comprising instructions for execution by a computer, the instructions including a computer-implemented method for synchronizing plural independent applications.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
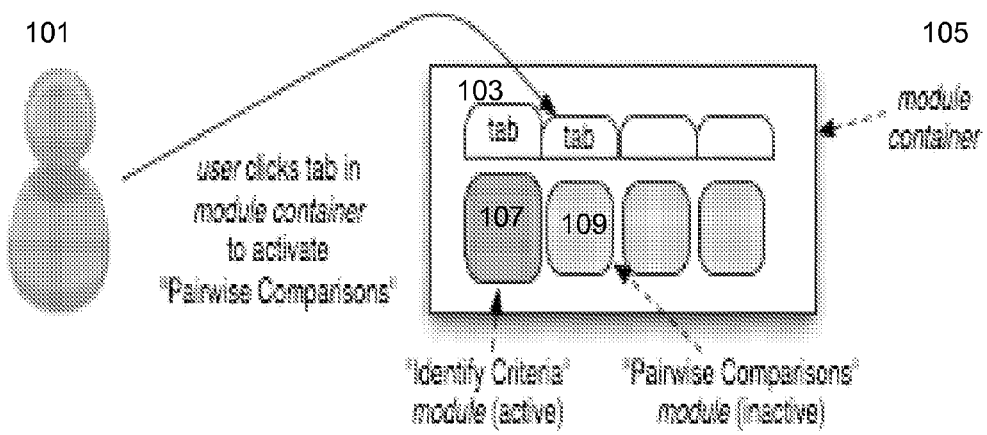
FIG. 1 is a diagram illustrating a user control event in an independent application to be synchronized with other applications.

In overview, the present disclosure concerns computer applications such as may be distributed over networks supporting data communication, signal, video, and/or voice services between wireless and/or wire line devices. Such computer applications can be implemented on an architecture sometimes referred to as a client-server architecture in which a server that runs one or more server programs which share a resource with the clients, and one or more clients that request the server's content or service function but generally do not share client resources with the server. More particularly, various inventive concepts and principles are embodied in systems, devices, and methods therein for synchronizing plural independent applications distributed among client computers so as to provide a coordinated user experience among the client computers.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to provide data and event handling for synchronizing independent web-based application modules that may be operating locally and/or distributed across an array of devices and platforms.

The platform can comprise modules that provide interactive data presentation and user controls for navigating through functionality and modifying data. These modules can be combined to form complete applications that drive an interactive user experience across an array of distributed, web-based devices and platforms. For example, one user in a group of users may act as a presenter and can synchronize user interfaces on the independent computers of users in the group and can update data in a shared database which can be reflected to the synchronized user interfaces. Alternatively, the group may be a peer-to-peer sharing of the database and a coordinated user experience so as to traverse generally the same user interfaces. In order to provide a dynamic, synchronized, and interactive user experience, one of the modules can:

Execute independently of other modules or combine to form complete applications.

Seamlessly react to and handle data and UI control events generated internally by the module or the application, or by other modules, or by a centralized data server.

Dispatch events describing internal user actions to be handled by 1) the module itself, 2) other local modules or 3) other remote modules.

The modules can be light weight and pluggable in any application on the platform, when the modules are not individually responsible for providing native event handling. A unified, generalized, and fault-tolerant mechanism for distributing events locally and remotely can meet this goal.

This disclosure assumes familiarity with object-oriented user interface development, or object-oriented and event driven user interface development.

DEFINITION SECTION

The following terms are used herein with the following specific definitions:

The term "module" is use herein to indicate an encapsulated collection of related user interface controls and data visualization components that provide distinct, well-defined, and independent functionality within a web-based application, for example, a decision support system application; further, the module is the software which provides the execution environment for performing the client side program module.

The term "local module" is used herein to indicate a type of module that executes in the same runtime environment relative to other modules (i.e. within the same application currently executing on the same computer); furthermore, local modules communicate with each other via events passed through the local event manager.

The term "remote module" is used herein to indicate a type of module that executes in a different runtime environment relative to other modules (i.e., within applications executing on different computers, or within different applications executing on the same computer); furthermore, remote modules communicate with each other via messages passed through the centralized data server.

The term "application" is used herein to indicate a collection of one or more modules, organized within a module container, that provide a synchronized decision process workflow.

The term "runtime container" is used herein to indicate the container within which an application is executed. An example of a runtime container is a standard web browser.

The term "user" is used herein to indicate an entity (human or programmatic) that interacts with modules, typically within an application.

The term "module container" is used herein to indicate a user interface construct that provides user controls for activating (displaying) and deactivating (hiding) local modules. The user controls can be provided as components in the screen of the application program, for example, a pull-down menu, a context menu, which can control the operation of the application program by clicking a predetermined position on the screen or selecting a predetermined menu item.

The term "local event manager" is used herein to indicate a mechanism internal to an application that passes events between local modules; hence, a local event manager may be associated with a module container and the local modules within the module container.

The term "centralized data server" is used herein to indicate a remotely accessible application programming interface (API) that provides data services, communicates data modification events to remote modules, and allows remote modules to pass events between each other.

The term "data service" is used herein to indicate a remotely accessible interface within a centralized data server that provides functionality allowing for the modification of data.

The term "event" is used herein to indicate an object generated by a module or the centralized data server that contains information describing an action that took place; an event is used to communicate the action between modules or module containers.

The term "user control event" is used herein to indicate a type of an event that describes a user control action based on a user control within a module or module container. Examples of user control events include activate module, deactivate module, collapse section of module, expand section of module, and the like. User controls and user control events can be constructed in accordance with conventional techniques.

The term "data event" is used herein to indicate a type of an event that describes the modification of data within the centralized data server pursuant to a request from a user.

The term "message" is used herein to indicate a serialized representation of an event; the format used when transmitting an event between remote modules via the centralized data server.

The term "message producer" is used herein to indicate a component within an application that serializes events received from the local event manager into messages and transmits the messages to the centralized data server.

The term "message consumer" is used herein to indicate a component within an application that de-serializes messages received from the centralized data server into events and transmits the events to the local event manager.

The term "event cache" is used herein to indicate a non-transitory storage area within a module that stores events received by a local event manager associated with a module for handling once the module has been activated within the module container.

The term "event caching policy" is used herein to indicate a logic rule that defines how a local event manager adds an event to an event cache associated with a particular module.

(End of Definition Section)

One or more embodiments discussed herein can solve problems stated above through the use of an event mechanism that distributes data events and user control events seamlessly across local and/or remote modules. The mechanism can unify local event communication with remote event communication by:
  Providing local event managers to pass events between local modules.
  Providing centralized data servers to pass events between remote modules.
  Providing message producers and consumers to allow local event managers to transmit events to and from centralized data servers.

Further in accordance with exemplary embodiments, by using a system and method that unifies user control event communication between local and remote modules with data event communication between modules and centralized data servers, a module receiving an event does not need to be aware of the location or implementation of the event's source. The receiving module can define sets of logic to handle any types of events, and those logic sets can operate uniformly regardless of where the event was generated and how it was transmitted to the module.

The following describes how a user control event is generated and handled:
  1. A user performs an action via user interface controls within a module or module container (ex: a user clicks a tab within the module container in order to activate the module associated with the tab).
2. The module or module container generates a user control event. (ex: the module container generates a user control event that represents and describes the module that was activated).
3. The module or module container passes the event to the local event manager.
4. The local event manager dispatches the event to all other interested local modules.
5. Each local module executes event cache policies to determine whether to immediately handle an event or to store it in the event cache (described in further detail below).
6. The local modules that are interested in the event handle the event with custom logic and perform their own actions accordingly (ex: the module that was previously active deactivates itself).
7. The local event manager then passes the event to the message producer.
8. The message producer serializes the event into a message.
9. The message producer transmits the message to the centralized data server.
10. The centralized data server transmits the message to message consumers within other remote applications (ex: other applications that need to stay synchronized with the source application will receive the message via their message consumers).
11. The message consumer receives the message and de-serializes it into a user control event.
12. The message consumer transmits the event to the local event manager.
13. The local event manager dispatches the event to all other interested local modules or module containers (just as in steps 4-5 above).
14. The local modules or module container handle the event with custom logic (just as in step 6 above; ex: the module container activates the module indicated by the event, causing the local application to stay synchronized with the remote source application).

As described above, the event mechanism unifies events that are received locally or remotely so that they may be handled seamlessly by the same units of event handling logic.

The following describes how a data event is generated and handled:
1. A user performs an action via user interface controls within a module that results in the modification of data (ex: a user adds a brainstorm item to the brainstorm criteria list via a text input control).
2. The module calls a remote data service within a centralized data server to modify the data (ex: the module calls a data service to add the brainstorm item).
3. The centralized data server modifies the data.
4. The centralized data server generates a message describing the data that was modified.
5. The centralized data server transmits the message to message consumers within remote applications (ex: applications that need to be aware of the newly added brainstorm item).
6. The message consumer receives the message and de-serializes it into a data event.
7. The event is handled by the local event manager and local modules (just as in steps 11-14 above; ex: the local brainstorm criteria module displays the newly added brainstorm item).

As described above, the event mechanism handles data events in the same manner as user control events, even though data events are generated by the centralized data server (as opposed to a module). This allows recipient modules to receive and handle both user control events and data events in a unified manner.

The following is a simplified description focusing on how event caching works (portions described above are omitted):
1. An event (user control or data) is received by a local event manager.
2. The local event manager dispatches the event to all other local modules.
3. Each local module executes event cache policies to determine whether to immediately handle an event or to store it in the event cache.
4. The logic first tests conditions within the module to determine whether to cache the event (ex: if the module is active within the module container, the event is handled immediately; otherwise it is stored in the event cache).
5. If the logic determines that it should cache the event, the logic then determines whether any other events in the event cache are affected by the new event (ex: if the cache already contains an event describing the current active pairwise comparison, the new event would override the old one, causing it to be evicted from the cache).
6. The logic then adds the event to the event cache.
7. Eventually, a user control event occurs that triggers the module to handle all events in the event cache (ex: the module is activated within the module container).
8. The module iterates through all events in the event cache, handling them with the same logic that is used when the event is handled immediately.

As described above, the event caching mechanism provides a robust way to cache events according to custom logic within a module. Whether an event is handled immediately or cached and the handled later, the event is handled with the exact same logic, again providing a seamless experience to the user.

Example Embodiment 1

The following example describes one possible embodiment, herein within a web-distributed application, for example, a decision support system sometimes referred to hereafter as "DL3." Familiarity is assumed with decision support software available from Decision Lens, Inc. In this example, a user intends to add additional criteria to the criteria tree and to adjust the available pairwise criteria comparisons accordingly. This embodiment is simple, to illustrate basic concepts.

The modules in this embodiment include:
"Identify Criteria"—This module encapsulates the user interface controls and data visualization components related to building a criterion tree. This module displays the current criteria tree, as retrieved from the centralized data server, and provides controls for adding and removing criteria to and from the tree.
"Pairwise Comparison"—This module encapsulates the user interface controls and data visualization components related to voting on pairwise criteria comparisons. The module displays the comparisons, as derived from the structure of the criteria tree, and provides controls for placing votes on the comparisons. The available comparisons are updated via the event mechanism whenever criteria are added to or removed from the criteria tree.

This logic indicates that there is a data dependency between the "Pairwise Comparison" module and the "Identify Criteria" module.

Further reference is made to the concept of "Local Modules": For a single local application instance, the modules "Identify Criteria" and "Pairwise Comparison" are deployed locally, relative to each other (i.e. the two modules are deployed within the same module container, which is contained within a single application, which executes within a single runtime container).

Further reference is made to the concept of "Remote Modules:" the modules "Identify Criteria" and "Pairwise Comparison" can also be deployed in multiple distributed application instances, meaning that they are remote modules (i.e. one instance of "Identify Criteria" may be deployed in application instance "A", while another instance of the same module may be deployed in application instance "B"; applications "A" and "B" execute in separate runtime containers).

Again, reference is made to the concept of "Application": The DL3 software is an application, instances of which are loaded and then executed on client computers; the DL3 software can contain plural modules, including "Identify Criteria" and "Pairwise Comparison". The DL3 software application, when executed among plural computers and when including a centralized data server (acting as a server), provides a synchronized decision process workflow with a coordinated user experience among the client computers, of which "Identify Criteria" and "Pairwise Comparison" are modules discussed in this example.

Reference is made to the concept of "Runtime Container": Instances of the DL3 application execute within runtime containers, which can be, for example, conventional web browser techniques, such as available in commercial web browsers such as Firefox, Chrome, or Internet Explorer, and variations and evolutions thereof.

Reference is again made to the definition of "User": In this embodiment, the application and its modules are configured to interact with human users through standard web browsers (runtime containers).

Reference is made to the concept of "Module Container": The application contains a module container that provides a graphical user interface with tab-based navigation controls for the user to activate (display) and deactivate (hide) the modules, which in this example are the "Identify Criteria" and "Pairwise Comparison" modules. Activation of either module causes the module's event cache to handle cached events. The active module is displayed so that the body of the active module covers the body of the deactivated module(s), leaving the tab of the deactivated module exposed while substantially the remainder of the deactivated module is covered.

Reference is made to the concept of "Local Event Manager": The application contains a local event manager that passes events between the local modules, here, the "Identify Criteria" and "Pairwise Comparison" local modules. For example, when a new criterion is created within "Identify Criteria", an event signaling the creation of the criteria is generated by "Identify Criteria" and is passed to the local event manager, which in turn passes the event to the local "Pairwise Comparison" module.

Reference is made to the concept of "Centralized Data Server": The application communicates with a centralized data server via data services published within a remotely accessible API. When criteria are added within the "Identify Criteria" local module, such as via interaction with a user, that module calls a data service to create the new criteria. The data service informs remote "Identify Criteria" and "Pairwise Comparison" modules that a new criterion has been added to the criteria tree via an event. When the user switches from "Identify Criteria" to "Pairwise Comparison" via controls within the module container (such as by selecting the tab for the "Pairwise Comparison" module on the GUI, an event is sent to the centralized data server, which passes the event to remote module containers, allowing the module containers to stay in sync.

Reference is made to the concept of "Data Service": The centralized data server contains data services, such as:

"createCriteria"—allows "Identify Criteria" modules to create new criteria, and inform other remote modules of the new criteria.

messaging service—allows the module container to inform other remote module containers when the active module has been changed, allowing the module containers to stay in sync with each other.

Reference is made to the concept of "Event": The "Identify Criteria" and "Pairwise Comparison" modules communicate via events to inform each other of new criteria (an example of a data event) or module activations (an example of a user control event) within the module containers.

Further, reference is made to the concept of "Data Event": When a new criterion is created within "Identify Criteria", the centralized data server dispatches a data event informing remote modules (other "Identify Criteria" and "Pairwise Comparison" modules) of the new criteria.

Further, reference is made to the concept of "User Control Event": When a user switches from "Identify Criteria" to "Pairwise Comparison" (or vice versa) via controls within the module container, the centralized data server dispatches a user control event to remote module containers, allowing them to perform the same module activation and stay in sync with each other.

Reference is made to the concept of "Message": When a data event occurs, such as when a new criterion is created within "Identify Criteria", such as when the local module "Identity Criteria" interacts with the user, the local module generates an event, and passes the event to the local event manager. The local event manager passes the event to a message producer, which serializes the event into a message for distribution via the centralized data server.

Reference is now made to the concept of "Message Producer": The message producer receives events signaling new or revised or updated date, in this example, the creation of criteria, and serializes them into messages for distribution via the centralized data server.

Reference is made to the concept of "Message Consumer": When the centralized data server distributes messages about data, e.g., criteria messages (serialized events), other applications receive the messages via their message consumers. The message consumers de-serialize the messages back into data events, e.g. data events indicating particularly criteria events, and the message consumers transmit the events to the local event manager.

Reference is made to the concept of "Event Cache": When a user is manipulating data that is to be stored in the centralized data server, in this example, creating new criteria, the active module within the module container is "Identify Criteria". This means that the local module "Pairwise Comparison" is inactive. When the local module "Pairwise Comparison" receives an event while inactive, the event is captured by the local module's event cache for handling once the local module has been activated within the module container. Once active, "Pairwise Comparison" will handle the event by updating the displayed criteria comparisons to reflect the new criteria.

Reference is now made to the concept of the "Event Caching Policy": Whenever a local module, in this example, the module "Pairwise Comparison", receives a criterion event while inactive, the event cache can perform an event caching policy to determine which events to scan for in the event cache, what to do with the located events in the event cache, and what to do with the received event. For example, for a criterion event, the event caching policy performs the following logic:

- The event cache is scanned to find older criteria events (which events to scan based on the type of the new event).
- The older criteria events are deleted (what to do with located events in the event cache based on their type and the type of the new event).
- The new criteria event is added to the cache (what to do with the received event).

In this example, the older criteria events are considered to be redundant and are deleted so that they are not executed when the local module "Pairwise Comparison" is activated. If the duplicate events were not deleted, the local module "Pairwise Comparison" would perform the same logic to update the displayed comparisons repeatedly, which is not necessary. In essence, the new criterion event replaces all of the previous criteria events, since only the most recent criteria is used. In another example, older events of the same type are considered to aggregate and are retained so as to be activated at the appropriate time (such as added participants). In yet another example, older events of the same type are considered to toggle, so that, of the events of the same type, only the most recent event is retained (such as a same participant logon-logoff). That is, events can be assigned a type which is stored together with the event in the cache, and an event caching policy can determine what to do with located events in the cache depending on the event type in the cache and the new event. Other variations of event caching policies can be created and added.

Figure 9:
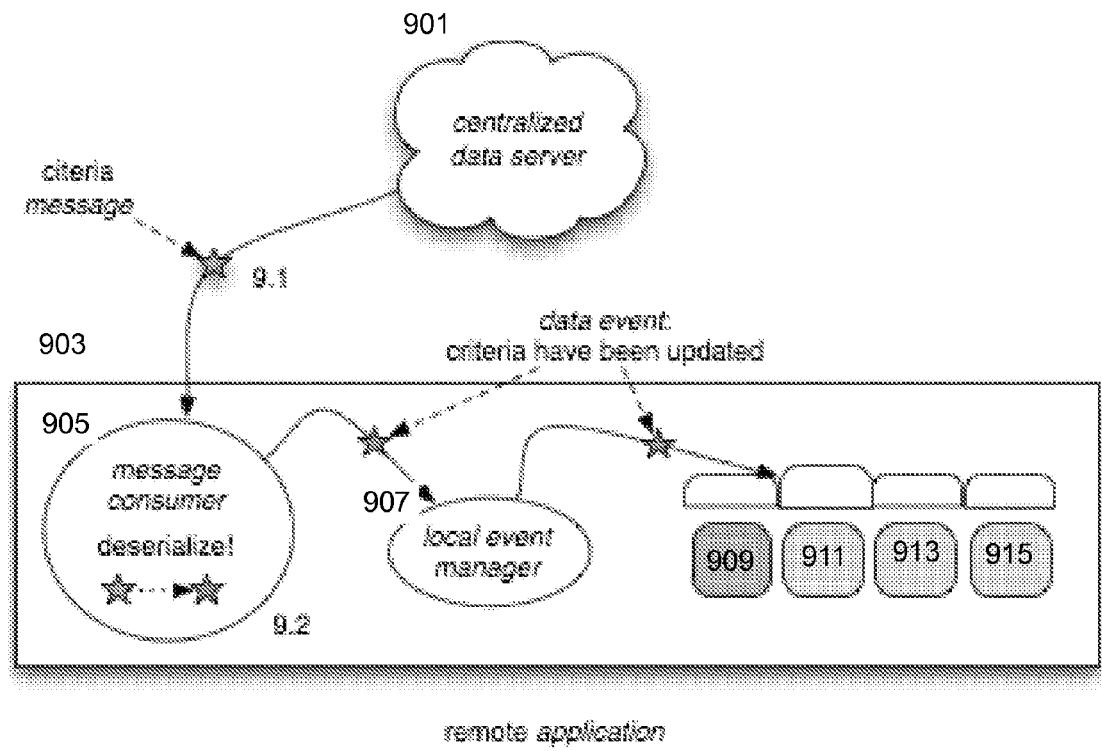
FIG. 9 is a diagram illustrating a data message to a remote application.
Figure 10:
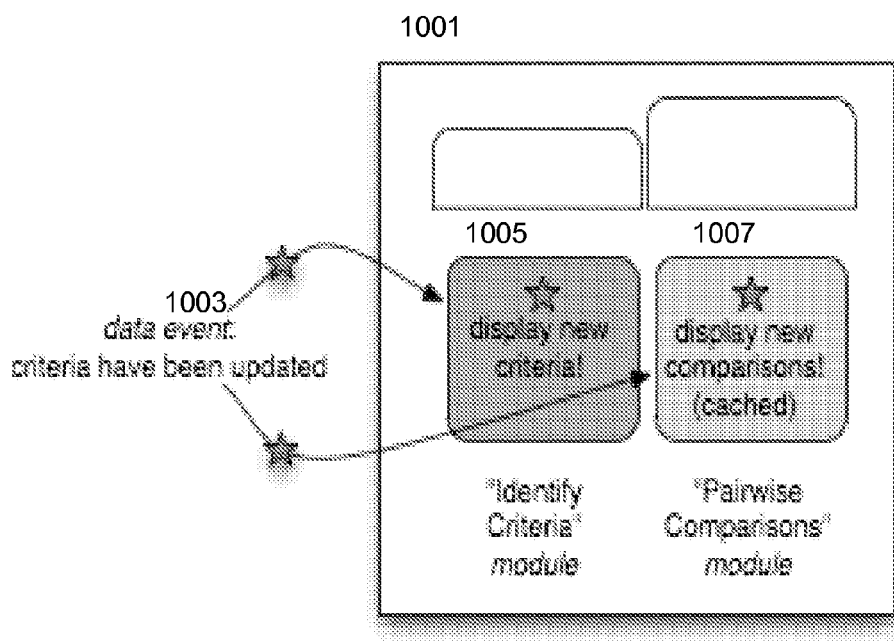
FIG. 10 is a diagram illustrating a data message being received and a data event being generated.
Figure 11:
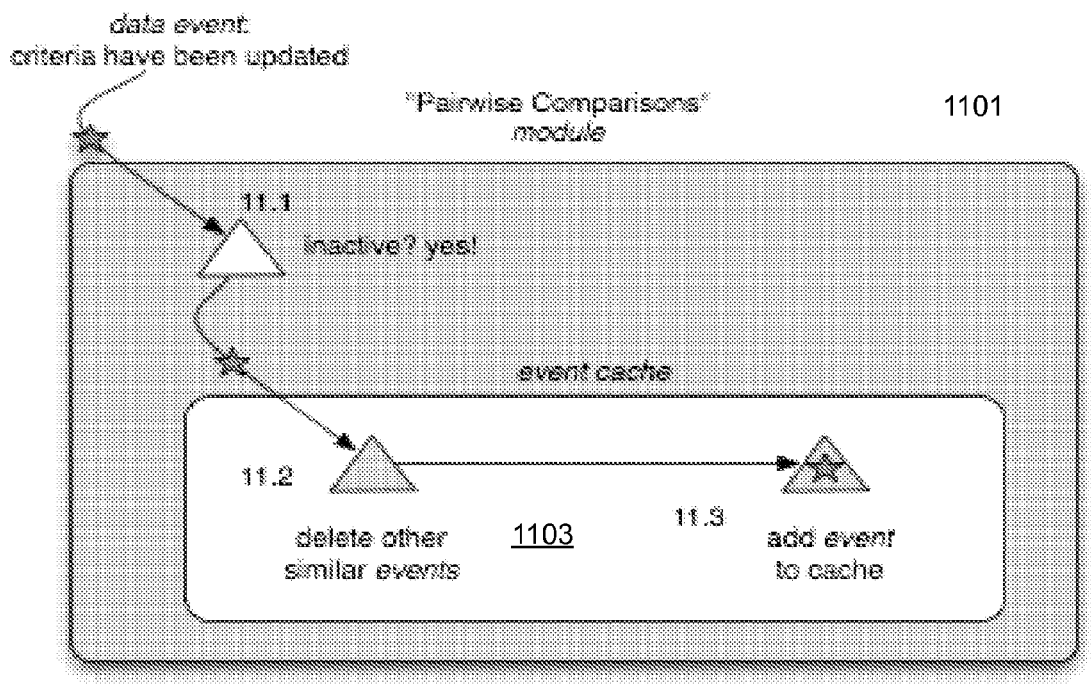
FIG. 11 is a first diagram illustrating event caching.
Figure 12:
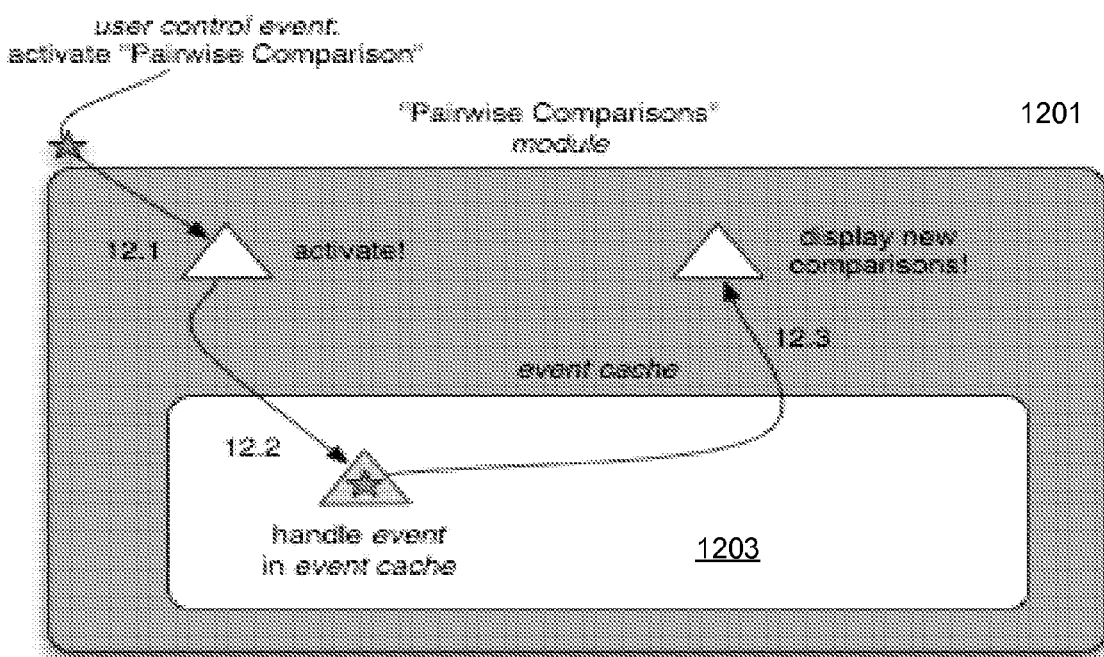
FIG. 12 is a second diagram illustrating event caching.

FIG. 1 to FIG. 12 provide an example embodiment discussing the generation of events, a sequence of actions taken in response thereto, and control mechanism to maintain coordination of the user experience among local and remote modules. FIG. 1 to FIG. 6 are used to discuss a sequence in connection with a user control event; FIG. 7 to FIG. 10 are used to discuss a sequence in connection with a data event; and FIG. 11 to FIG. 12 are used to discuss a sequence in connection with event caching, applicable to both user control events and data events.

The following describes how a user control event is generated and handled within the context of this example, in connection with the sequence illustrated in order from FIG. 1 to FIG. 6.

1. Referring now to FIG. 1, a diagram illustrating a user control event in an independent application to be synchronized with other applications will be discussed and described. In FIG. 1, a module container 105 is displayed on a user interface to a user 101. The module container includes tabs 103 each associated with a different local module such as "Identify criteria" 107 and "pairwise comparisons" 109. In this example, the local module "Identify Criteria" 107 is active, and "Pairise Comparison" 109 is inactive. The user interface displays the active local module (here, "Identify Criteria" 107) to the user in the active content area of the browser and information is updated in the active local module and the user can interact with the active local module, all according to known techniques. The user 101 clicks the tab associated with the "Pairwise Comparison" module to activate the inactive local module "Pairwise Comparison" 109 within the module container 105.

2. In response to the user 101 selecting the inactive module "Pairwise Comparison" 109, the module container 105 generates a user control event that represents and describes the activation of the "Pairwise Comparison" module.

Figure 2:
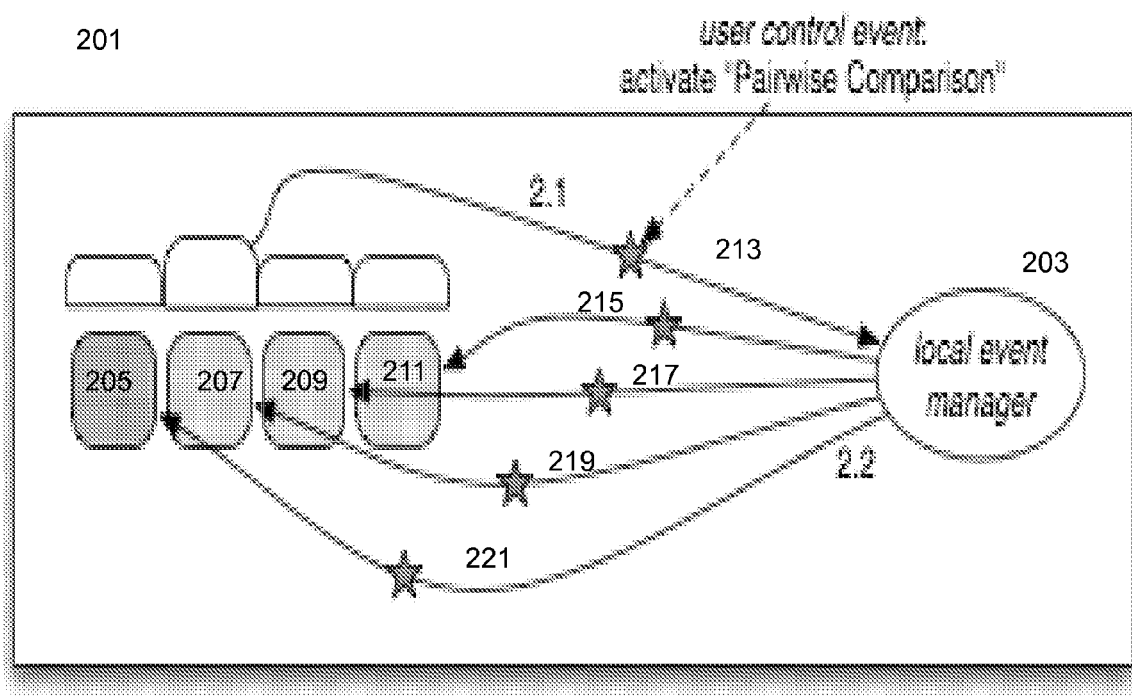
FIG. 2 is a diagram illustrating a local module passing a user control event to a local event manager.

3. Referring now to FIG. 2, a diagram illustrating a local module passing a user control event to a local event manager will be discussed and described. FIG. 2 illustrates a computer 201, active local module 205 (corresponding to "Identify Criteria" 107 in FIG. 1), inactive local module 207 (corresponding to "Pairwise Comparison" in FIG. 1), 209, and 211, user control events 213, 215, 217, 219, 221, and local event manager 203. A module container contains the illustrated local modules 205, 207, 209, 211. The module container passes the user control event 213 to the local event manager 203 (step 2.1); the user control event 213 represents the activation of the "Pairwise Comparison" module.

4. The local event manager 203 dispatches the user control event 215, 217, 219, 221 to all other modules within the module container (step 2.2), when the local event manager 203 receives the user control event.

Figure 3:
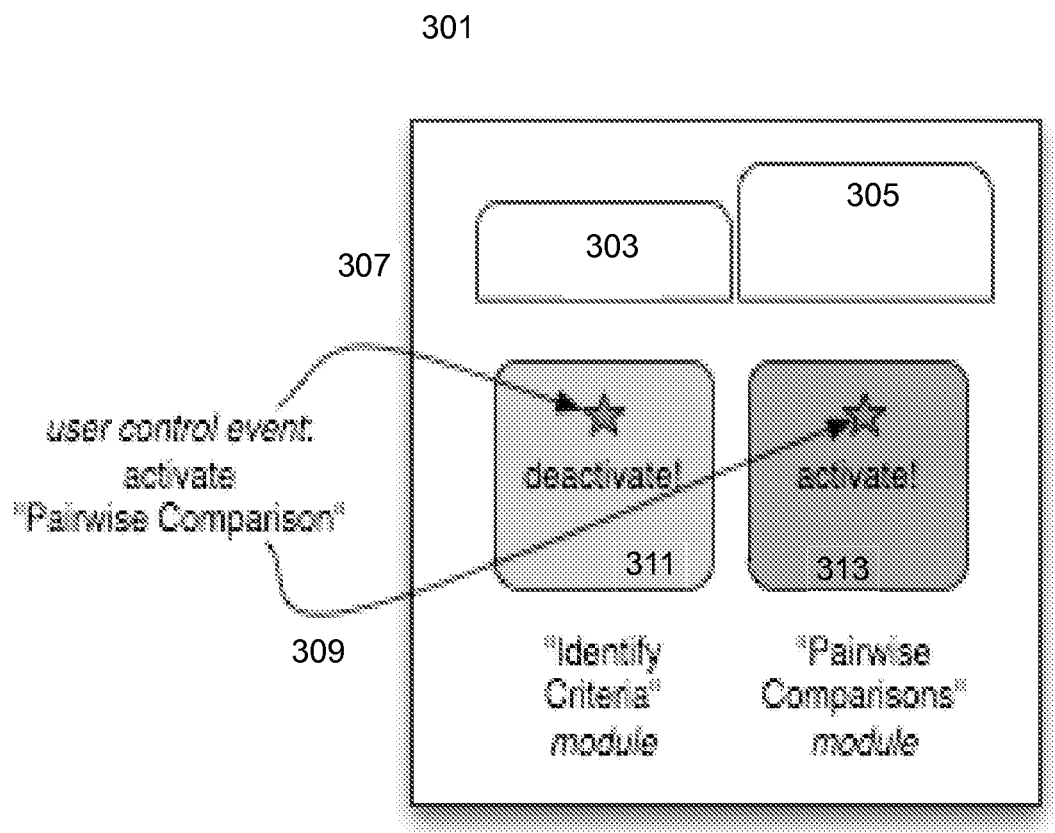
FIG. 3 is a diagram illustrating a local module being activated.

5. Referring now to FIG. 3, a diagram illustrating a local module being activated will be discussed and described. FIG. 3 illustrates a module container 301 which contains a local module "Identify Criteria" 311 and "Pairwise Comparisons" 313. In this example, initially the "Identify Criteria" module 311 is active and the "Pairwise Comparisons" module 313 is inactive. Other local modules are omitted from the illustration for ease of discussion. The "Pairwise Comparison" module 313 and the "Identify Criteria" module 311 each receive the user control event 309 which instructs to activate a local module, namely "Pairwise Comparisons". Each module reads the event 309. The "Identify Criteria" module 311 deactivates itself when it receives this event 309, and the "Pairwise Comparison" module 313 activates itself when it receives this event. Moreover, the module that is activated due to this event, in this example, "Pairwise Comparisons" 313, causes the event cache of the local module to handle all of its cached events.

6. All other modules, such as "Identify Criteria", deactivate themselves when the event 309 is received indicating to activate a different module. Also, all of the modules that are deactivated by the user control event 309 each cause their event caches to capture incoming events by storing them in the event cache per local module instead of handling the received events.

Figure 4:
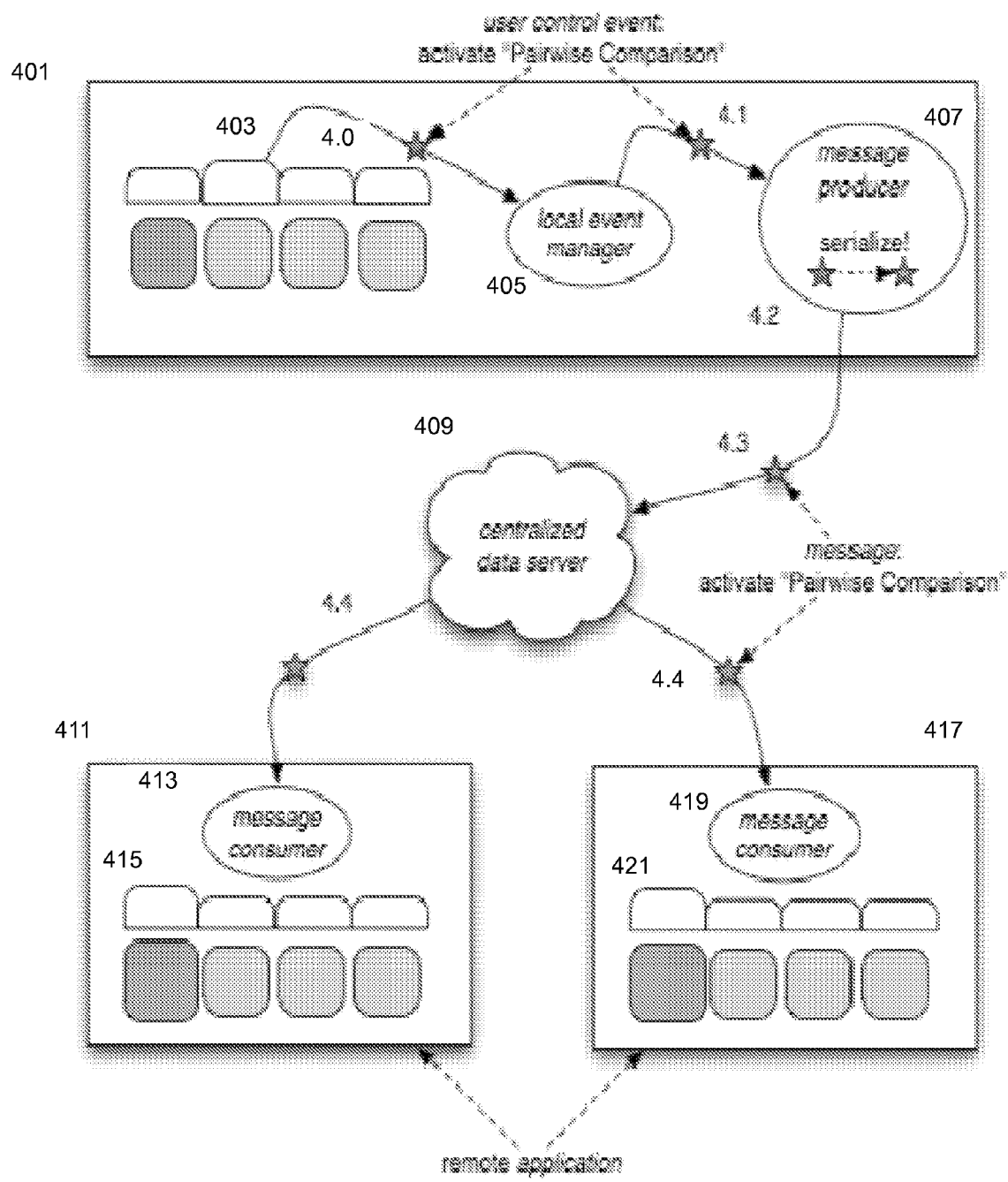
FIG. 4 is a diagram illustrating a local event manager passing an event ultimately as a message to remote applications.

7. Referring now to FIG. 4, a diagram illustrating a local event manager passing an event ultimately as a message to remote applications will be discussed and described. In this figure, there is illustrated a computer 401 includes an active local module "Pairwise Comparison" 403 (in the module container), a local event manager 405, and a message producer 407; remote computers 411, 417 each include a message consumer 413, 419 configured to reciprocally receive and transmit messages regarding events in a same format as the local event manager 405 and each including module containers and modules 415, 421 denominated as "remote modules" since they are remote to the "local modules" 403; and a centralized data server 409 that receives and transmits messages regarding events and stores shared data shared among the remote and local modules. As previously described, the user control event "activate 'Pairwise Comparison'" is sent 4.0 to the local event manager 405. The local event manager 405 then passes 4.1 the event to the message producer 407.

8. The message producer 407 serializes 4.2 the local event, that is the module activation event, into a message, when the message producer 407 receives an event. Any appropriate technique may be used to serialize the event into a message, for example, embedding the event into a communication packet automatically without user intervention.

9. The message producer 407 then transmits 4.3 the message to the centralized data server 409.

10. When the centralized data server 409 receives the message with the event, the centralized data server 409 transmits 4.4 the message to message consumers 413, 419 within other remote applications that need to stay synchronized with the originating application (i.e. the application containing the module container 403 that generated the module activation event).

Figure 5:
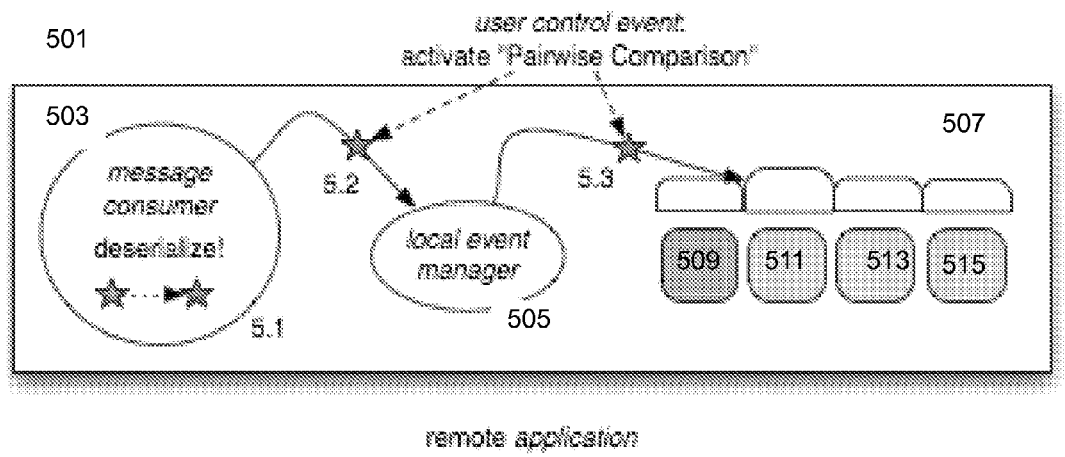
FIG. 5 is a diagram illustrating a remote application that receives the message.

11. Referring now to FIG. 5, a diagram illustrating a remote application that receives the message will be discussed and described. In FIG. 5, a computer 501 includes a message consumer 503, a local event manager 505, and a module container 507. The module container includes local modules 509, 511, 513, 515. (The term "local" is used herein, although note that this module container 507 is remote with respect to the module that originated the event (e.g., FIG. 4, 403). The message consumer 503 receives the message and de-serializes 5.1 the received message into a user control event that represents the activation of the "Pairwise Comparison" module. The user control event has the same form before being serialized and after being de-serialized, so that the local event manager 505 does not differentiate between events which were originated locally and events which were originated remotely.

12. When the message is de-serialized into a user control event, the message consumer 503 transmits 5.2 the event to the local event manager 505.

13. When the local event manager 505 receives the user control event, the local event manager 505 dispatches 5.3 the event to the module container 507.

Figure 6:
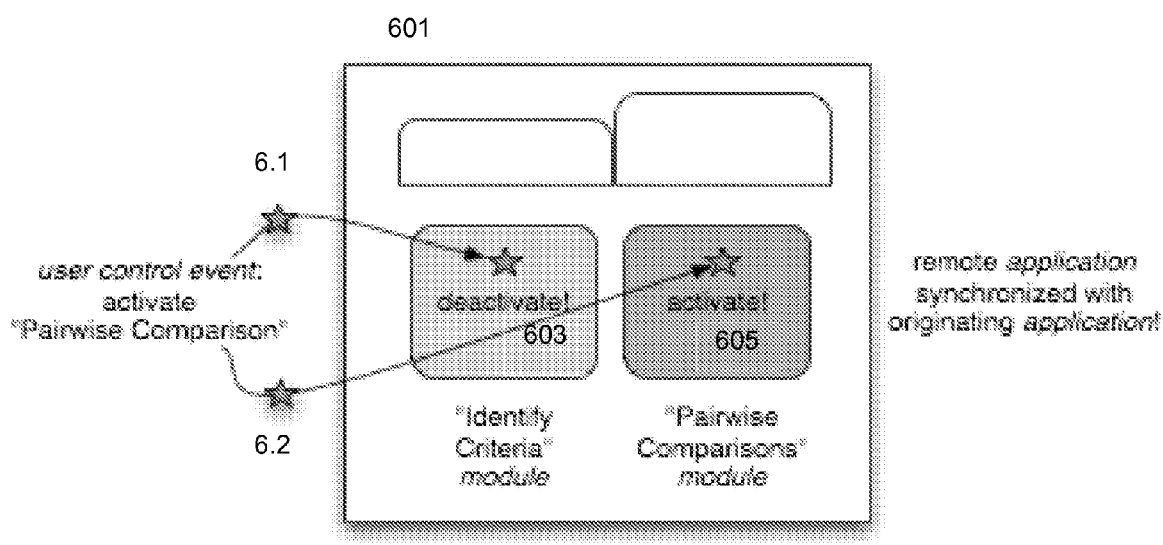
FIG. 6 is a diagram illustrating the remote application now synchronized with the originating local application.

14. Referring now to FIG. 6, a diagram illustrating the remote application now synchronized with the originating local application will be discussed and described. FIG. 6 illustrates a module container 601 that is remote from the originating local application; the module container 601 is a copy of the originating local application, or at least contains copies of some of the modules in the originating local application, although the modules which are remote from the originating application are executing in a different run-time environment and perhaps on a different computer and hence can be asynchronous until re-coordinated as described herein. In this example, the module container 601 contains an active local module 603 "Identify Criteria" and an inactive local module 605 "Pairwise Comparisons". The modules 603, 605 in the module container 601 each receives 6.1, 6.2 the user control event "activate 'Pairwise Comparison'" and each handles the event, causing the activation of the local "Pairwise Comparison" module 605 and the deactivation of the local "Identify Criteria" module 603. This keeps the remote application generally synchronized with the originating application, that is, the local and remote modules behave as if controlled by the same user at the originating application, ultimately using the same handling of the event whether or not the originating application is local or remote.

The following describes how a data event is generated and handled within the context of this example, in connection the sequence illustrated in order from FIG. 7 to FIG. 10.

Figure 7:
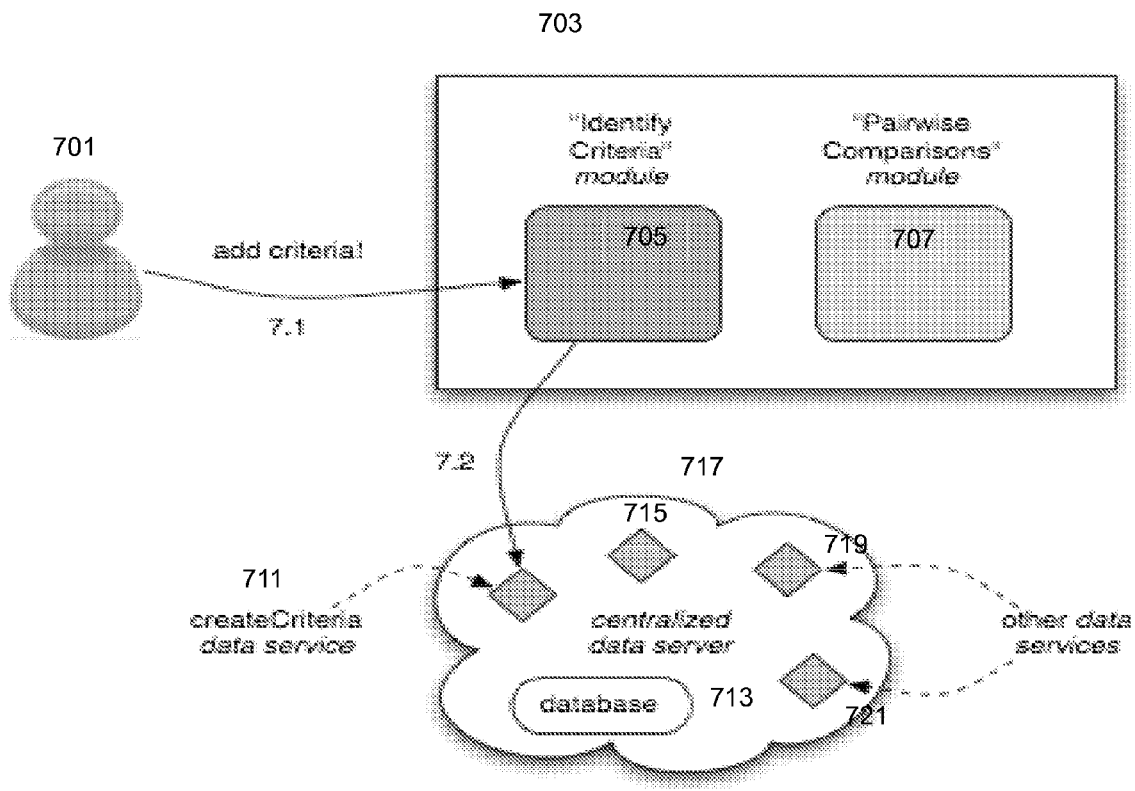
FIG. 7 is a diagram illustrating a data manipulation in an independent application to be synchronized with other applications.

1. Referring now to FIG. 7, a diagram illustrating a data manipulation in an independent application to be synchronized with other applications will be discussed and described. FIG. 7 illustrates a user 701, a local application 703, local modules 705, 707 within the local application 703; and a data server 711 with a database 713 and data services 711, 715, 719, 721. The user 701 interacts with the local application 703 to add 7.1 a new criterion to the criteria tree via user interface controls provided within the "Identify Criteria" module 705.

2. When the local module 705 attempts to operate on the data which is shared among users and hence is stored at the database 713, the "Identify Criteria" 705 module calls 7.2 the remote "createCriteria" data service 711 within the centralized data server 717 to add the new criteria. Conventional techniques can be used to provide the data services and call to the data services.

Figure 8:
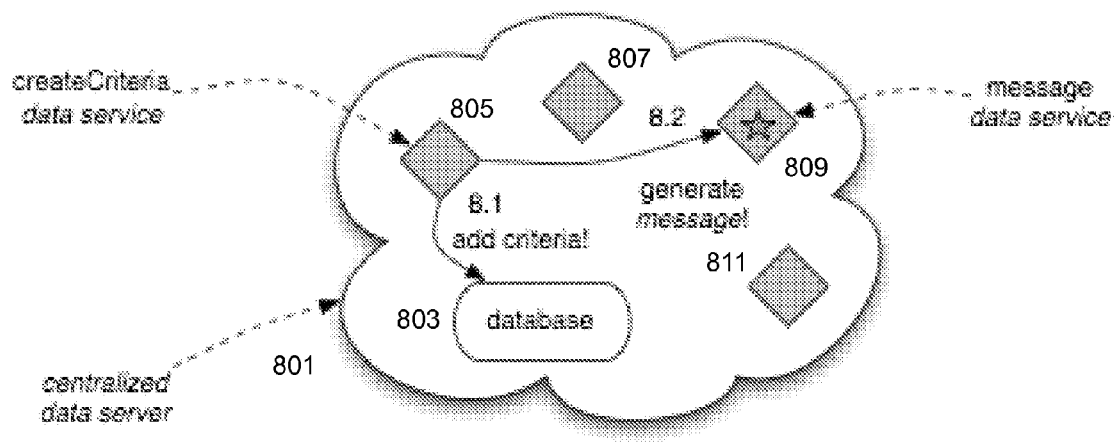
FIG. 8 is a diagram illustrating the data manipulation being served at a centralized data server.

3. Referring now to FIG. 8, a diagram illustrating the data manipulation being served at a centralized data server will be discussed and described. FIG. 8 illustrates the data server 801, a database 803 within the data server 801, and data services 805, 807, 809, 811 within the data server 801, one of which is a message data service 809. The centralized data server 801 adds the new criteria to the database (FIG. 8, 8.1), in accordance with standard database techniques, when the data server 801 receives the call instructing the data server with the data manipulation for the database 803.

4. Also, once the data server 801 has performed the requested data manipulation (e.g., create criteria 805, the centralized data server informs 8.2 the message data service 809 to generate a message describing the new criteria. The message data service 809 will generate the message describing the new criteria to all of the remote applications. Optionally, the remote applications can indicate to the message data service 809 that they are interested in the data, so that the message data service 809 sends only the subscribed remote applications the message.

5. Referring now to FIG. 9, a diagram illustrating a data message to a remote application will be discussed and described. This figure illustrates a centralized data server 901, and a computer 903. The computer 903 includes a message consumer 905, a local event manager 907, and local modules 909, 911, 913, 915. The centralized data server 901 transmits 9.1 the message regarding the data event to message consumers 905 associated with remote applications that need to keep their criteria data synchronized with the originating application.

6. When the message consumer 905 receives the message with the data information, the message consumer 905 de-serializes 9.2 the message into a data event describing the new criteria. The data event is then sent to the local event manager 907, which forwards the data event to the local modules 909, 911, 913, 915.

7. Referring now to FIG. 10, a diagram illustrating a data message being received and a data event being generated will be discussed and described. FIG. 10 illustrates a module container with an inactive local module 1005 and an active local module 1007, "Identify Criteria" and "Pairwise Comparisons", respectively. When the data event (criteria updated) is received by the local modules 1005, 1007, the criteria event causes the following actions at the local modules:

a. The "Identify Criteria" module 1005 updates itself to display the new criteria.

b. The "Pairwise Comparison" module 1007 updates itself to display newly derived comparisons.

Note that, when a module is inactive, the module's event cache stores the event for handling at the time that the module is activated, instead of immediately performing the action.

The following describes how event caching works within the context of this example, in connection with the sequence of events illustrated in order in FIG. 11 (illustrating event caching) to FIG. 12 (illustrating performing the action for the event). Here, the event can be a user control event or a data event.

1. As a starting point for this discussion, in step 7 immediately above, assume the "Pairwise Comparison" module is inactive, meaning the module's event cache will store the received event so that it is handled immediately once the module is activated.

2. Referring now to FIG. 11, a first diagram illustrating event caching will be discussed and described. FIG. 11 illustrates a local module 1101 ("Pairwise Comparisons") with an event cache 1103 that stores events which are to be acted on by the local module 1101. Here, the local module is inactive. The "Pairwise Comparison" module 1101 receives a data event (e.g., "criteria have been updated") and executes its event cache policies and determines whether the module is inactive 11.1. Because the module 1101 is inactive, it is determined to cache the event in the module's event cache 1103 for later handling.

3. When the module 1101 determines to cache the event, the event cache policy of the local module 1101 looks through the list of cached events for the local module to find other events of a type also representing newly added criteria. Any matching events (that is, of the same type) are deleted 11.2 from the event cache for the local module.

4. The local module 1101 then adds 11.3 the event to the event cache, when it is determined that the event is to be cached, instead of performing the usual action for the event.

5. Referring now to FIG. 12, a second diagram illustrating event caching will be discussed and described. FIG. 12 illustrates a local module 1201 ("Pairwise Comparisons") with an event cache 1203; the event cache is storing one or more events including the data event "criteria have been updated", and the local module 1201 in this example is inactive. When the "Pairwise Comparison" module is activated 12.1 via a user control event (i.e. the user clicks the "Pairwise Comparison" tab in the module container), the module 1201 will receive the user control event that activates the module; when the module 1201 is activated by the user control event, the module 1201 handles 12.2 all events in its per module event cache 1203, including the criteria event.

6. When the criteria event is handled, the "Pairwise Comparison" module updates itself to display newly derived comparisons (FIG. 12, 12.3). The action performed on an event is the same without regard to whether the event is being handled from the cache or the event is being handled without being cached.

Figure 13:
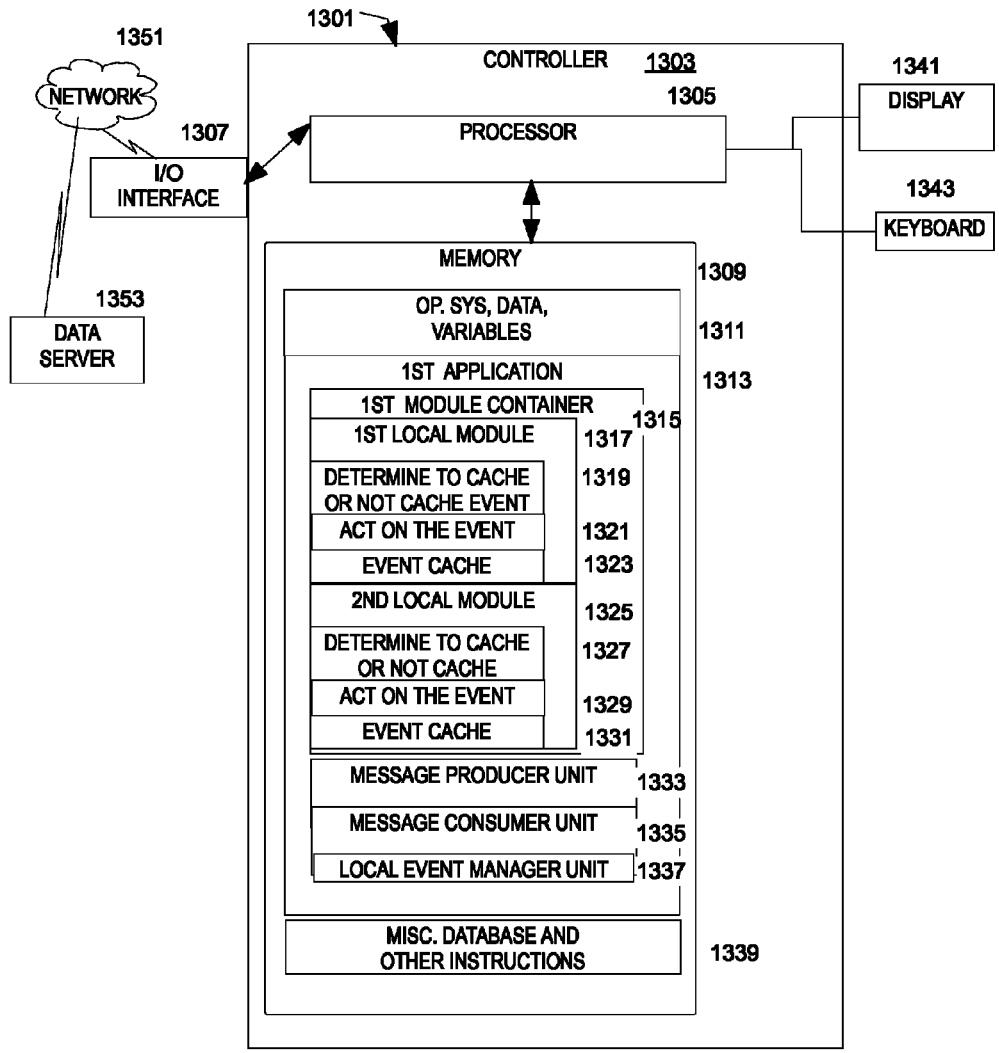
FIG. 13 is a block diagram illustrating portions of an exemplary computer constructed for use in being synchronized with plural applications.

Referring now to FIG. 13, a block diagram illustrating portions of an exemplary computer constructed for use in being synchronized with plural applications will be discussed and described. The computer 1301 may include one or more controllers 1303, an i/o interface 1307 for communication with an external network 1351, a display interface to a display 1341, and/or a input interface to a user input device such as a keypad 1343. The controller 1303 can include a processor 1305 and a memory 1309.

The processor 1305 may comprise one or more microprocessors and/or one or more digital signal processors. The memory 1309 may be coupled to the processor 1305 and may comprise a read-only memory (ROM), a random-access memory (RAM), a programmable ROM (PROM), and/or an electrically erasable read-only memory (EEPROM). The memory 1309 may include multiple memory locations for storing, among other things, an operating system, data and variables 1311 for programs executed by the processor 1305; computer programs for causing the processor to operate in connection with various functions such as an application 1313, a message producer unit 1333, a message consumer unit 1335, a local event manager unit 1337, and/or other processing; and a database 1339 for other information used by the processor 1305. The computer programs may be stored, for example, in ROM or PROM and may direct the processor 1305 in controlling the operation of the computer 1301.

The computer 1301 can communicate over the i/o interface 1307 to external devices, such as the data server 1353 which is reached over the network 1351. The network 1351 can be any computer or communications network appropriate for communicating messages between the data server 1353 and the computer 1301, and for communication messages between the computer 1301 and other computers (not illustrated) which are also running the application 1313 and are mutually configured to communicate with each other, so that they can stay synchronized with the local application 1313.

The user may invoke functions accessible through the user input device such as the keyboard 1343. The user input device may comprise one or more of various known input devices, such as a keyboard 1343, a computer mouse, a touchpad, a touch screen, a trackball, a known voting device, and/or a keypad. The display 1341 may present information to the user by way of a conventional liquid crystal display (LCD) or other visual display, and/or by way of a conventional audible device (e.g., a speaker, not illustrated) for playing out audible messages.

Responsive to signaling from the user input device such as the keyboard 1343, in accordance with instructions stored in memory 1309, or automatically upon receipt of certain information via the i/o interface 1307, the processor 1305 may direct the execution of the stored programs.

The processor 1305 may be programmed with an application 1313. The application can be programmed to include one or more local modules 1315, 1325. The local modules each can be programmed to determine 1319, 1327 whether or not to cache the event; to act 1321, 1329 on the event; and to include an event cache 1323, 1331.

The processor 1305 may be programmed with a message producer unit 1333. The message producer unit 1333 is internal to its module container 1315. That is, the message producer unit performs its functions for the modules that are provided within the module container 1315, but not for modules within a different module container. The message producer unit can communicate with the data server 1353 over the i/o interface 1307. The message producer unit is programmed to transmit an event to the data server 1353 as a message, when the message producer unit 1333 receives the event. The message communicates the event to the other applications outside the module container 1315 that need to stay synchronized with the local modules 1317, 1325.

The processor 1305 may be programmed with a message consumer unit 1335. The message consumer unit 1335 is internal to its module container 1315. That is, the message consumer unit performs its functions for the modules that are provided within the module container 1315. The message consumer unit can communicate with the data server over the i/o interface 1307, especially by receiving messages from the data server 1353. The message consumer unit 1335 can transmit a remote event which it receives to the local event manager 1337, when the message consumer unit receives the message, which is configured to communicate a remote event, from the data server.

The processor 1305 may be programmed with a local event manager unit 1337. The local event manager unit 1337 also is internal to its module container 1315. That is, the local event manager unit performs its functions for the modules that are provided within the module container 1315, The local event manager unit 1337 can dispatch an event to all of the local modules 1317, 1325 within the same application 1313 of the same module container 1315; also, the local event manager unit passes the event to the message producer unit 1333; the dispatching and the passing occur when the event is received by the local event manager unit 1337 from one of the local modules 1317, 1325 executing within the module container 1315, or from the module container 1315 itself, where the event represents a user control action within the one of the local modules 1317, 1325. The local event manager unit 1337 dispatches a local event to the local modules 1317, 1325 when a remote event is received from the message consumer unit 1335, the remote event having been generated by one of other applications outside the module container that need to stay synchronized with the local modules 1317, 1325 such as on another computer (not illustrated).

Each of the local modules 1317, 1325 in the processor may be programmed to determine 1319, 1327 whether or not to cache the event. For example, the processor can determine to not cache the event for the local module 1317, 1325 when the local module is active, and to cache the event when the local module 1317, 1325 is not active, when the local module 13171325 receives the event from the local event manager unit 1337.

Each of the local modules 1317, 1325 in the processor may be programmed to act 1321, 1329 on the event. The action which is taken depends on the event. However, the action which is taken is the same whether the event has been retrieved from the event cache 1323, 1331 for the local module 1317, 1325 or is being acted on without being stored in the event cache 1323, 1331. Notwithstanding, the different local modules 1317, 1325 may take actions for the event which are different from other local modules, as in the above example.

Each of the local modules 1315, 1325 may be programmed with separate storage for an event cache 1323, 1331. The event cache 1323, 1331 is separate and specific for each of the local modules 1317, 1325, and each event cache 1323, 1331 stores events for only its associated local module 1317, 1325.

The above-discussed memory 1309 and processor 1305 can function as computer readable medium, and/or the computer can include one or more disk drives (not illustrated) or memory data storage devices as the computer readable medium. Typically, the disks might be one or more of the following, and variations and evolutions thereof: a hard disk drive, a floppy disk drive, a CD ROM or digital video disk, an optical disk. The number and type of drives may vary, typically with different computer configurations. Disk drives may be options, and for space consideration, may be omitted from the computer system used in conjunction with the processes described herein. A typical memory data storage device is a flash memory data storage device or flash memory card sometimes referred to as a "memory stick" or "flash drive," some of which can incorporate a USB connection to the computer. The computer may also include a CD ROM reader and CD recorder, which can be interconnected by a bus along with other peripheral devices supported by the bus structure and protocol (not illustrated). The bus can serve as the main information highway interconnecting other components of the computer. A disk controller (not illustrated) can interface disk drives to the system bus. The disks and flash memory storage may be internal or external to the computer.

It should be understood that FIG. 13 is described in connection with logical groupings of functions or resources. One or more of these logical groupings may be omitted from one or more embodiments, for example, and/or performed on a different processor. Likewise, functions may be grouped differently, combined, or augmented without parting from the scope discussed herein. Similarly, the present description may describe various databases or collections of data and information. One or more groupings of the data or information may be omitted, distributed, combined, augmented, or provided locally and/or remotely without departing from the scope discussed herein.

Figure 15:
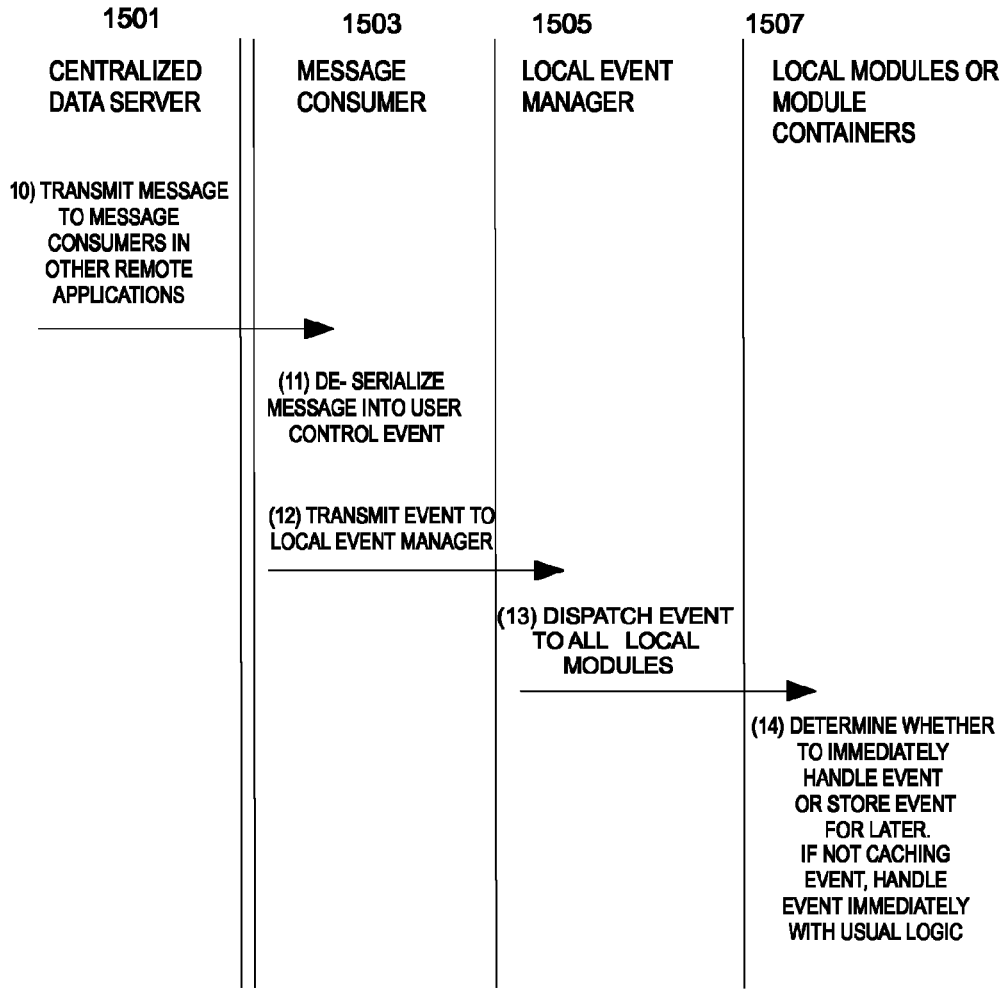
Figure 16:
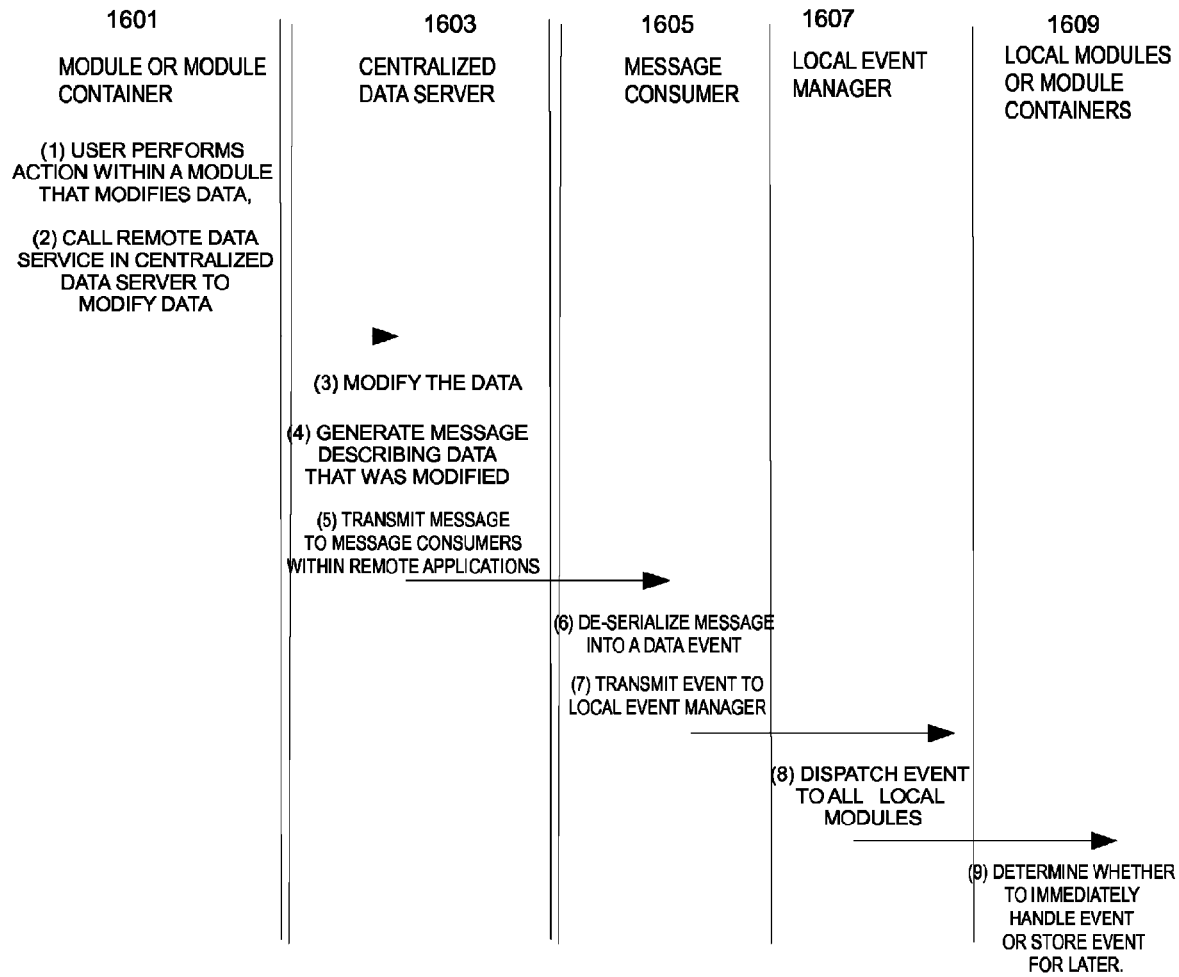
FIG. 16 is a sequence diagram illustrating a data event.
Figure 17:
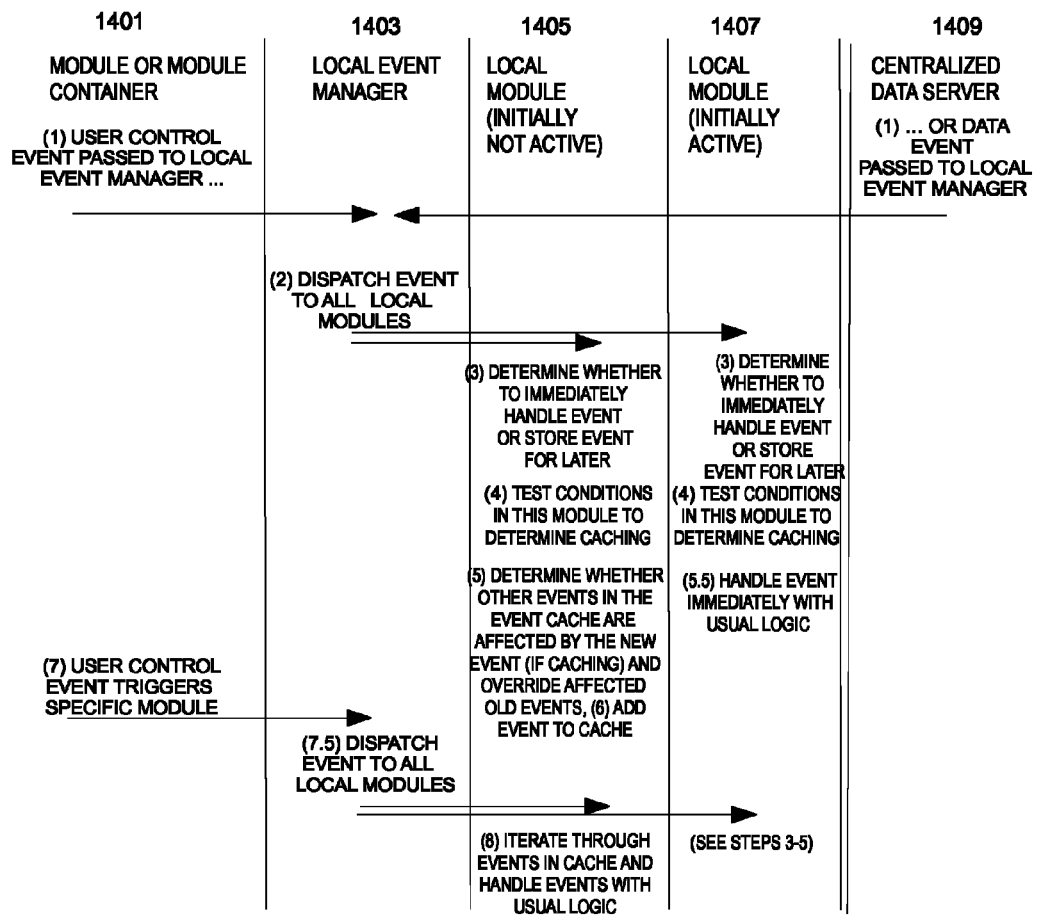
FIG. 17 is a sequence diagram illustrating event caching with a data event or a user control event.

FIG. 14 to FIG. 17 are sequence diagrams that illustrate the user control event sequence (FIG. 14, FIG. 15), the data event sequence (FIG. 16), and the event caching sequence (FIG. 17). Details are omitted where they are described elsewhere.

Figure 14:
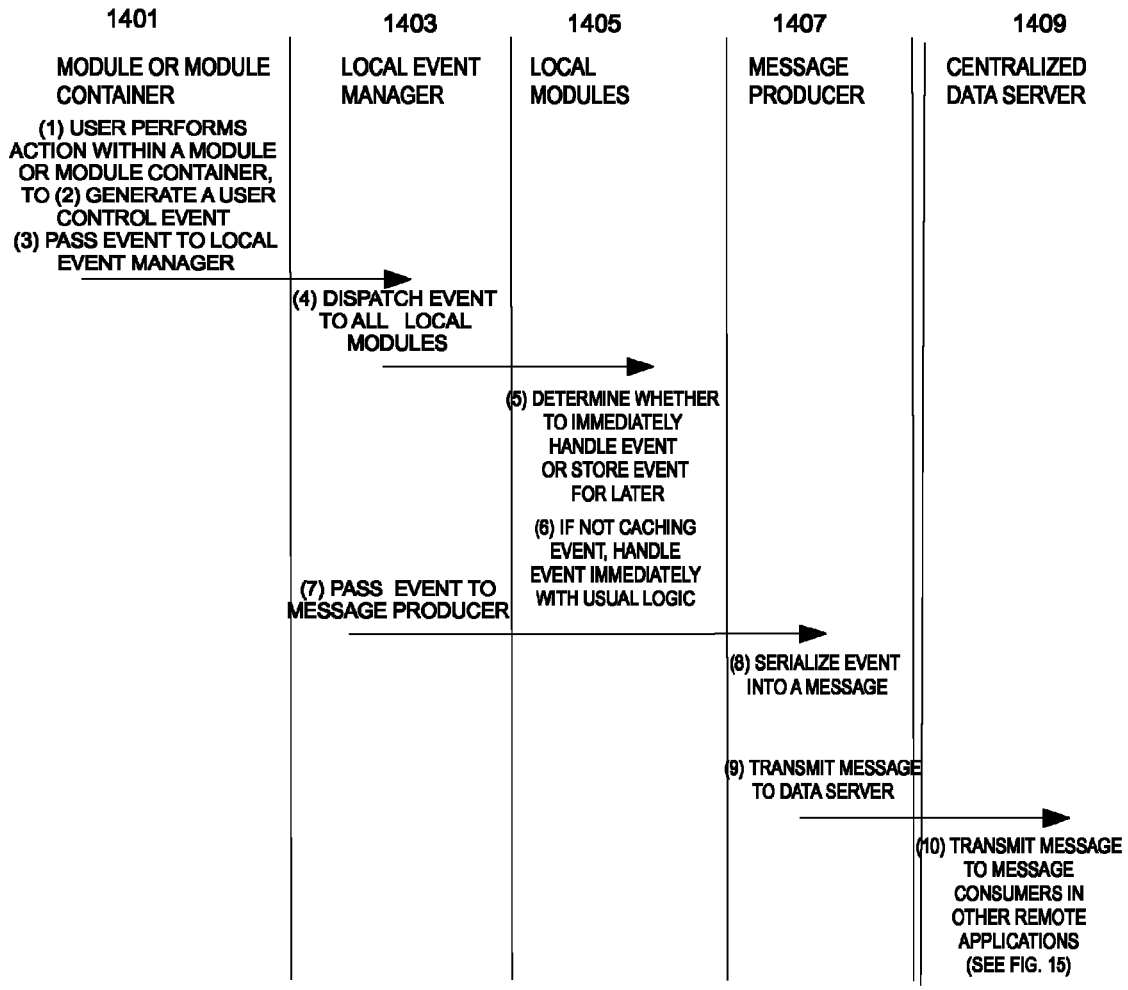
FIG. 14 and FIG. 15 together are a sequence diagram illustrating a user control event.

Referring now to FIG. 14 and FIG. 15 (FIG. 15 being a continuation of FIG. 14), a sequence diagram illustrating a user control event will be discussed and described. The following describes how a user control event is generated and handled:

(1) A user performs an action via user interface controls within a module or module container 1401, where the action is predefined as a user control action.

(2) In response to the user control action, the module or module container 1401 automatically without further user manual input generates a user control event that represents and describes what the user did.

(3) Then, the module or module container 1401 passes the event to the local event manager 1403.

(4) Upon receiving the event, without further user manual input, the local event manager 1403 dispatches the event to all other interested local modules 1405.

(5) Upon receiving the event, each of the local modules 1405 executes event cache policies to determine whether to immediately handle an event or to store it in the event cache.

(6) The local modules 1405 that are interested in the event either cache the event or handle the event immediately, and perform their own pre-determined actions according to the event.

(7) Furthermore, upon receiving the event, without further user manual input, the local event manager 1403 passes the event to the message producer 1407.

(8) Upon receiving the event, the message producer 1407 serializes the event into a message.

(9) After serializing the event, and automatically without further user input, the message producer 1407 transmits the message to the centralized data server 1409.

(10) After receiving the event, the centralized data server 1409 transmits the message to message consumers within other remote applications that need to stay synchronized with the source application, which has the module or module container 1401 that originated the event.

(11) The message consumer 1503 (within each of the other remote applications) receives the message from the data server 1501, and the message consumer 1503 de-serializes the received message into a user control event.

(12) After de-serializing the received message into the user control event, the message consumer 1503 transmits the event to the local event manager 1505; this is the local event manager at the remote application, and is not the local event manager 1403 corresponding to the module or module container 1401 that originated the event.

(13) The local event manager 1503 (for the remote application) dispatches the event to all other interested local modules or module container, just as in steps (4) and (5) above except that this local event manager 1503 is remote from where the event originated.

(14) The local modules or module container handle the event, as in step 6 above except that this local module or module container is remote from where the event originated.

As described above, the event mechanism unifies events that are received locally or remotely so that they may be handled seamlessly by the same units of event handling logic.

Referring now to FIG. 16, a sequence diagram illustrating a data event will be discussed and described. The following describes how a data event is generated and handled, although details are omitted which are discussed elsewhere herein:

(1) A user performs an action via user interface controls within a module or module container 1601 that results in the modification of data, i.e., a data event is generated by the user.

(2) The module or module container 1601 calls a remote data service within a centralized data server 1603 to modify the data (ex: the module calls a data service to add the brainstorm item), according to known techniques.

(3) The centralized data server 1603 modifies the data, in response to the call to the data service, in accordance with known techniques.

(4) The centralized data server 1603 generates a message describing the data that was modified, when the data has been modified.

(5) The centralized data server 1603 transmits the message that was generated to message consumers 1605 within remote applications that need to stay synchronized with the originating application.

(6) The message consumer 1605 at each of the remote applications receives the message and de-serializes it into a data event.

(7) The data event is transmitted from the message consumer 1605 to the local event manager 1607, to be handled by the local event manager 1607 and local modules 1609 (just as in steps (11) to (14) above except that the event is a data event).

(8) The data event is dispatched from the local event manager 1607 to the local modules or module containers 1609.

(9) Then, the local modules 1609 determine whether to immediately handle the data event or store the data event for later handling.

As described above, the event mechanism handles data events in the same manner as user control events, even though data events are generated by the centralized data server (as opposed to a module). This allows recipient modules to receive and handle both user control events and data events in a unified manner.

Referring now to FIG. 17, a sequence diagram illustrating event caching with a data event or a user control event will be discussed and described. Many of the details have already been discussed and therefore are omitted. The following is a simplified description focusing on how event caching works for user control events and data events:

(1) An event (user control or data) is transmitted from a module or module container 1401 and received by a local event manager 1403.

(2) The local event manager 1403 dispatches the event to all other local modules 1405, 1407. One or more of the local modules initially may be active at the time it receives the event, e.g., local module 1407. Other local modules are not active 1405 at the time it receives the event.

(3) Each of the local modules 1405, 1407 executes event cache policies to determine whether to immediately handle an event or to store it in the event cache, regardless of whether the local module is active or inactive.

(4) The determination of whether or not to cache the event tests conditions within the local module 1405, 1407.

(5) If the determination is that that the local module should cache the event, the local module then determines whether any other events in the event cache are affected by the new event and overrides affected old events. (6) The logic then adds the event to the event cache for the local module 1405.

(5.5) If the determination is that the local module should handle the event immediately instead of caching, the local module 1407 does so, using the usual instructions for handling the event.

(7) Eventually, a user control event occurs at the module or module container 1401 that triggers the module to handle all events in the event cache for the local module. The user control event is dispatched from the module or module container 1401 to the local event manager 1403. (7.5) The local event manager 1403 dispatches the event to all local modules 1405, 1407.

(8) The local module 1405 determines to immediately handle the event instead of storing for later, and iterates through all events in the event cache, handling them with the same instructions that are used when the event is handled immediately. The other local module 1407 determines to store the event for later, repeating steps (3), (4), and (5) above for this local module 1407.

Referring now to FIG. 18A to FIG. 18E, flow charts illustrating a procedure for synchronized plural applications will be discussed and described. The procedure can advantageously be implemented on, for example, a processor of a controller, described in connection with FIG. 13, FIG. 19 (see below), or other apparatus appropriately arranged.

Figure 18A:
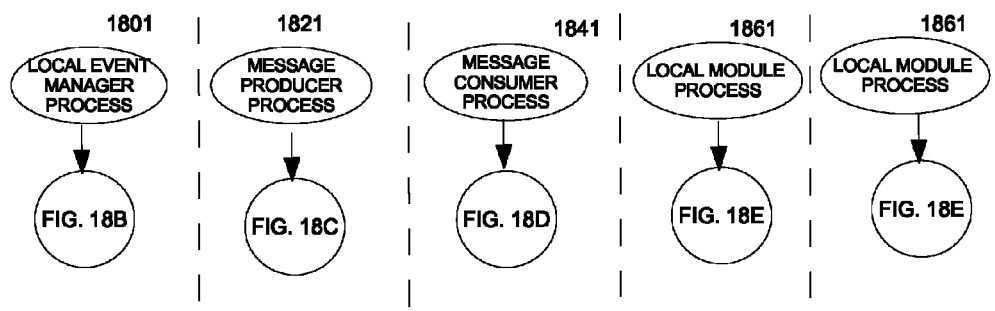
FIG. 18A to FIG. 18E are flow charts illustrating a procedure for synchronized plural applications.

FIG. 18A illustrates the processes and shows that they can be substantially concurrently performed. In this example, the processes include a local event manager process 1801, a message producer process 1821, a message consumer process 1841, and two local module processes 1861, illustrated in more detail respectively in FIG. 18B, FIG. 18C, FIG. 18D, and FIG. 18E. The two local module processes are representative of any number of local module processes, for example, three or more local module processes. These will be discussed in more detail below, although details which have been previously discussed can be omitted.

Figure 18B:
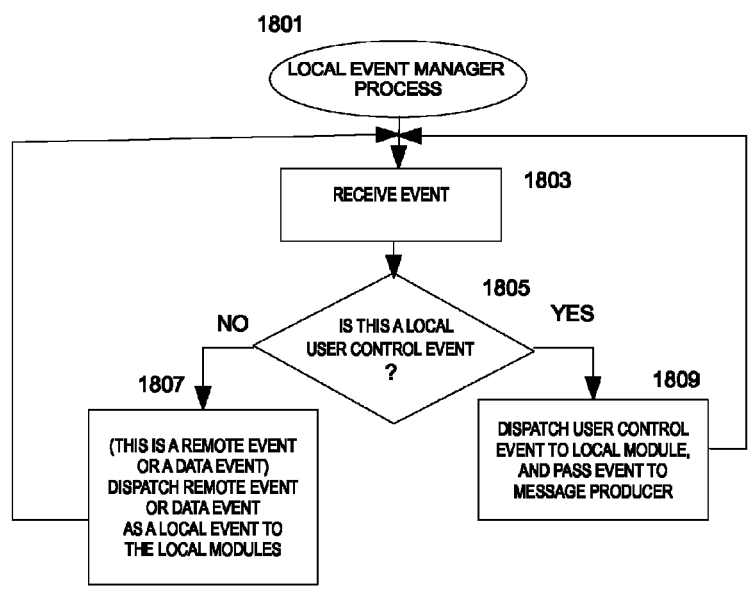

Referring now to FIG. 18B, a local event manager process 1801 will be discussed and described. The local event manager process 1801 can receive an event 1803. The process 1801 then determines 1805 whether the event is a user control event. If it is a local user control event, then the process 1801 dispatches 1809 the user control event to a local module process and passes the event to a message produces process. However, if the event is not a local user control event, that is, the event is a remote event or a data event, then the process 1801 dispatches 1807 the remote event or the data event as a local event to the local modules. The local event manager process 1801 then loops back, to receive and process the next event.

Figure 18C:
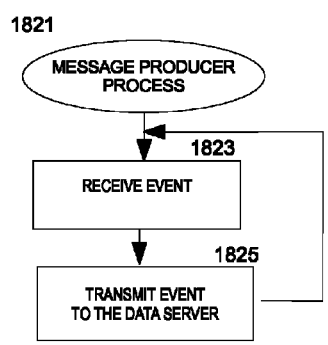

Referring now to FIG. 18C, a message producer process 1821 will be discussed and described. The message producer process 1821 can receive 1823 an event. Then, the message producer process can transmit 1825 the event to a data server for further handling. The message producer process 1821 then loops back, to receive and process the next event.

Figure 18D:
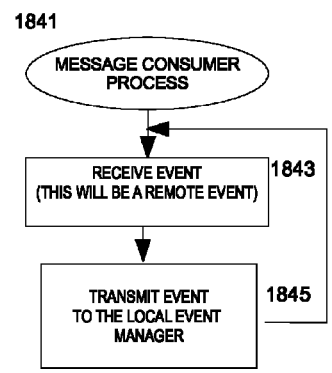

Referring now to FIG. 18D, a message consumer process 1841 will be discussed and described. The message consumer process 1841 can receive 1843 an event. The event will be a remote event. Then, the message consumer process 1841 can transmit 1845 the event to the local event manager. The message consumer process 1841 then loops back, to receive and process the next event.

Figure 18E:
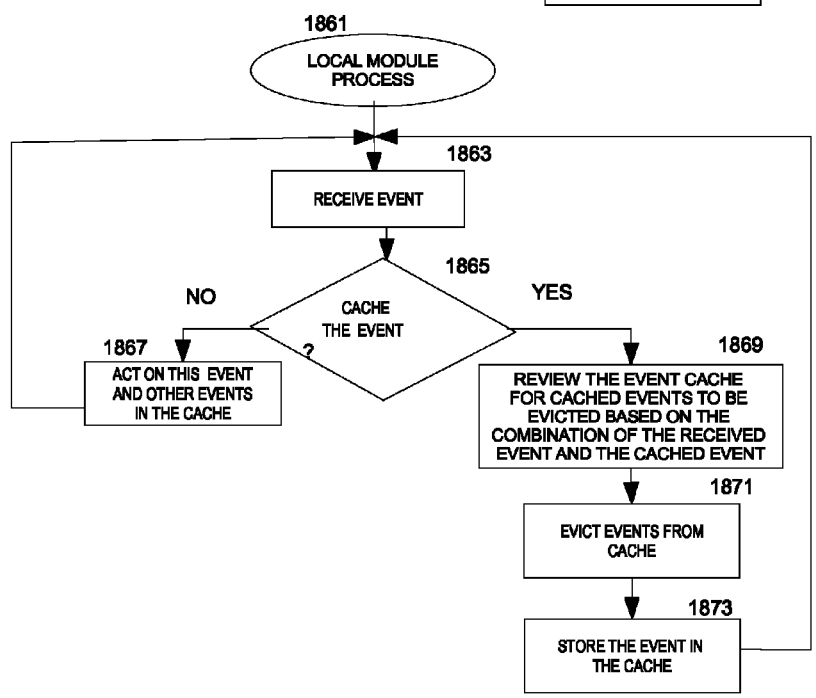

Referring now to FIG. 18E, a local module process 1861 will be discussed and described. The local module can include additional processing, for example, to create a user interface and to interact with a user, or the like. However, the additional processing is omitted from this discussion to avoid obscuring the invention.

The local module process 1861 can receive 1863 an event. Then, the local module process 1861 determines 1865 whether to cache the event. If the local module process 1861 determines to not cache the event, the local module process 1861 acts 1867 on the received event and on all other events which are in the cache for the local module. Typically, the determination whether to cache the event is based on whether the local module process 1861 is in an active mode, and the active mode can be switched to inactive mode by a predetermined event.

However, if the local module process 1861 determines to cache the event, the local module process 1861 reviews 1869 the event cache for cached events to be evicted based on the combination of the received event and the cached event; those events are marked to be evicted. Then, the local module process 1871 evicts the marked events from the cache for the local module process; events which are not marked to be evicted are retained in the cache for the local module process. Then, the local module process stores 1873 the received event in the cache.

The local module process 1861 then loops back, to receive and process the next event.

Note that the local module process 1861 will eventually act on events which are stored in the cache (which have not been evicted), when an events is received that the local module process determines to not cache. In this way, time-consuming processing of events and the attendant delays which can be apparent to the user can be avoided until the local module process 1861 becomes active. Furthermore, processing of events which may be redundant or even unnecessary due to subsequent events can be avoided, further reducing unnecessary consumption of computing resources.

Example Embodiment 2

Figure 19:
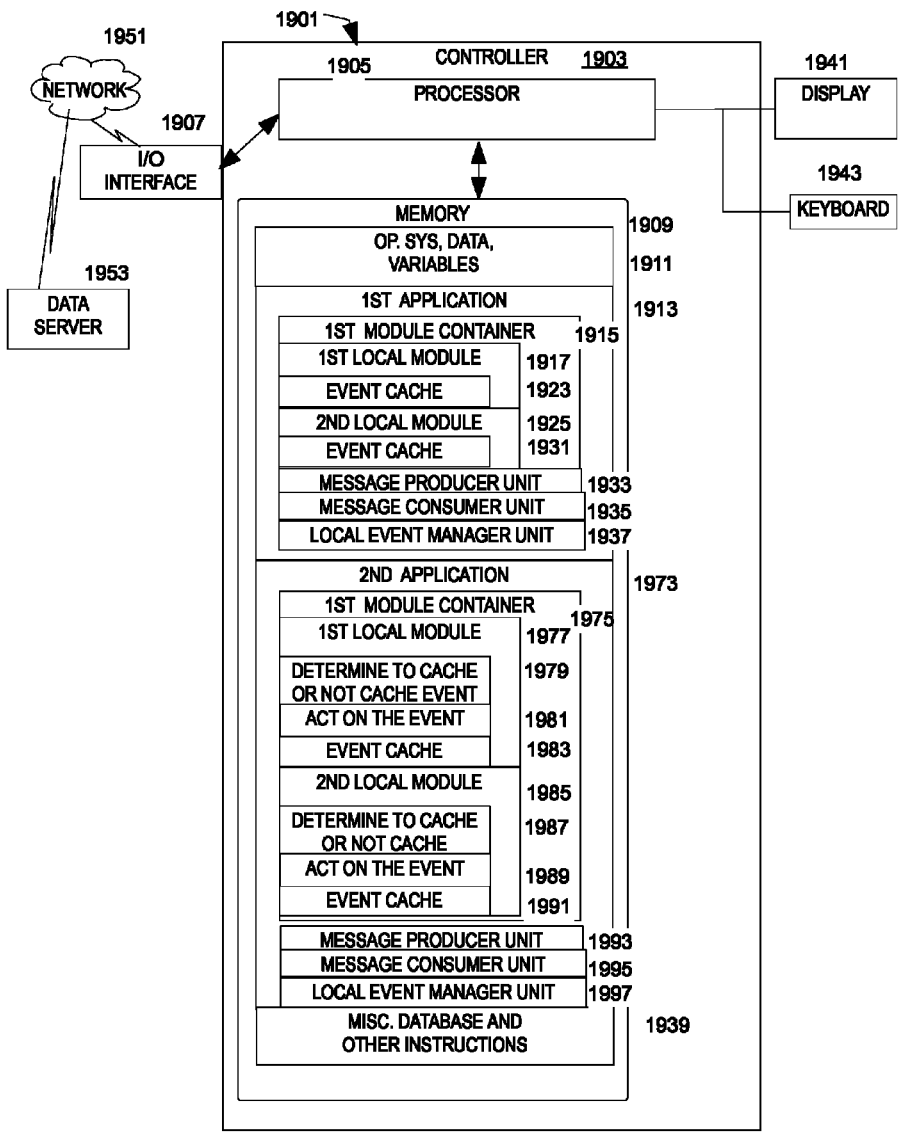
FIG. 19 is a block diagram illustrating portions of a second embodiment of a computer constructed for use in being synchronized with plural applications.

Referring now to FIG. 19, a block diagram illustrating portions of a second embodiment of a computer constructed for use in being synchronized with plural applications will be discussed and described. The second embodiment has the same elements illustrated as the computer in FIG. 13, except that reference numbers begin with "19 . . . " instead of "13 . . . " (for example, computer 1301 is computer 1901). In FIG. 19, a detailed illustration of contents of 1st local module 1917 and 2nd local module 1925 are not illustrated due to lack of space. The elements which were discussed in connection with FIG. 13 may be omitted from the following discussion so as to avoid obscuring the discussion.

In comparison to FIG. 13, it will be noted that FIG. 19 shows a 1st application 1913 (illustrated in FIG. 13; parts in this figure are omitted from the illustration) and additionally shows 2nd application 1973. The 2nd application 1973 can include, for example, a 1st module container 1975, a 2nd module container, message producer unit 1993, message consumer unit 1995, and local event manager unit 1997.

The 1st application 1915, 1st local module 1917, its event cache 1923, 2nd local module 1925, its event cache 1931, message producer unit 1933, message consumer unit 1935, and local event manager unit 1937 can have the same description respectively as the 1st application 1313, 1st module container 1315, 1st local module 1317, its event cache 1323, 2nd local module 1325, its event cache 1331, message producer unit 1333, message consumer unit 1335, and local event manager unit 1337 of FIG. 13.

As illustrated in FIG. 19, the processor 1905 also may be programmed with the 2nd application 1973. The 2nd application 1973 contains 1st module container 1975, message producer unit 1993, message consumer unit 1995, and local event manager unit 1997. The description of the 2nd application 1973 is the same as the description of the 1st application. That is, the 2nd application 1973 can include a 1st local module 1977 and a 2nd local module 1985. The 1st local module 1977 and the 2nd local module 1985 each can be programmed individually to determine 1979, 1987 to cache or not cache the event, and to act 1981, 1989 on the event. The 1st local module 1977 and the 2nd local module 1985 each can include an event cache 1983. The 2nd application also can include the message producer unit 1993, the message consumer unit 1995, and the local event manager unit 1997, which communicate to the data server 1953 and to modules within their own application, that is, to the 1st local module 1977 and the 2nd local module 1985 within the 2nd application 1973.

In this example embodiment, the 1st application 1913 and the 2nd application 1973 are considered to be remote with respect to each other, despite being on the same controller 1903. Accordingly, events that are passed between the 1st application 1913 and the 2nd application 1973 are considered to be remote events and not local events.

It will be appreciated that these simple modules are constructed to provide a robust event control mechanism, which can coordinate remote users so as to provide a user experience which appears to be synchronized. Moreover, because the modules are simple, they can be easily used to adapt architectures which are not event-based, so as to provide interactive collaboration amongst plural different users. Furthermore, the relationship between the computers of the users is essentially a peer-to-peer type relationship which merely uses the server to communicate between peers.

It should be noted that the term computer or computer system may be used interchangeably herein. Each of these terms is used to denote a device ordinarily used by one user at a time. However, the user of the term "computer" is further intended to encompass devices such as are ordinarily referred to as a personal digital assistant, personal assignment pad, personal computer, cellular handset or device, laptop, mainframe computer, tablet computer, or equivalents thereof provided such units are arranged and constructed for operation in connection with a user interface.

Furthermore, the communication and computer networks of interest include those that transmit information in packets, for example, those known as packet switching networks that transmit data in the form of packets, where messages can be divided into packets before transmission, the packets are transmitted, and the packets are routed over network infrastructure devices to a destination where the packets are recompiled into the message. Such networks include, by way of example, the Internet, intranets, local area networks (LAN), wireless LANs (WLAN), wide area networks (WAN), and others. Protocols supporting communication networks that utilize packets include one or more of various networking protocols, such as TCP/IP (Transmission Control Protocol/Internet Protocol), Ethernet, X.25, Frame Relay, ATM (Asynchronous Transfer Mode), IEEE 802.11, UDP/UP (Universal Datagram Protocol/Universal Protocol), IPX/SPX (Inter-Packet Exchange/Sequential Packet Exchange), Net BIOS (Network Basic Input Output System), GPRS (general packet radio service), I-mode and other wireless application protocols, and/or other protocol structures, and variants and evolutions thereof. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
   an i/o interface operable to transmit and receive communications over at least a portion of a communication network; and
   a processor cooperatively operable with the i/o interface, and configured with
      local modules contained within a module container of a same application;
      a message producer unit to communicate with a data server over the i/o interface;
      a message consumer unit configured to communicate with the data server over the i/o interface;
      a local event manager unit that dispatches an event to all of the local modules within the same application of the same module container, and passes the event to the message producer unit, when the event is received by the local event manager unit from one of the local modules executing within the module container or from the module container to represent a user control action within the one of the local modules or the container for the local modules; and the local event manager unit dispatches a local event to the local modules as the event when a remote event is received from the message consumer unit, the remote event being generated by one of other applications outside the module container that need to stay synchronized with the local modules;
      the message producer unit transmits the event to the data server as a message configured to communicate the event to the other applications outside the module container that need to stay synchronized with the local modules, when the event is received from the local event manager unit;
      the message consumer unit transmits the remote event to the local event manager unit, when the message consumer unit receives the message configured to communicate the remote event from the data server;
      each of the local modules determines to not cache the event for the local module when the local module is active, and to cache the event when the local module is not active, when the local module receives the event from the local event manager unit; and
      the local module acts on the event instead of storing the event for later action, when the determination is to not cache the event; and the local module stores the event in an event cache per the local module for later action, when the determination is to cache the event.

2. The computer system of claim 1, wherein the local module acts on each event in its event cache using the same action for cached events as for events which were not cached.

3. The computer system of claim 1, wherein
   the message consumer unit transmits a data event to the local event manager unit, when the message consumer unit receives a message configured to communicate the data event from the data server, the data event representing a modification of data at the data server by the one of the other applications outside the module container that need to stay synchronized with the local modules.

4. The computer system of claim 1, wherein
   the local module determines to not cache the event, when the module is in interactive mode on a user interface within the module container; and determines to cache the event, when the module is in a background of the user interface within the module container.

5. The computer system of claim 1, wherein
   the local module determines whether one or more of other events stored in the event cache of the local module is to be overridden by the event, and evicts the one or more of the other events stored in the event cache when the one or more of the other events is to be overridden, when the local module determines to cache the event.

6. The computer system of claim 1, wherein
   the local module acts on all events stored in the cache for the local module, when a user control event activates the local module within the module container.

7. The computer system of claim 1, wherein the same application is a web-distributed application that supports multiple simultaneous users each operating separate module containers with local modules that are the other applications outside the module container that need to stay synchronized.

8. A computer-implemented method, for synchronizing plural independent applications, comprising:
   dispatching, from a local event manager unit in a computer processor device, an event to all of local modules within a same application of a same module container on the computer processor device, and passing the event to a message producer unit in the computer processor device, when the event is received by the local event manager unit from one of the local modules executing within the module container or from the module container to represent a user control action within the one of the local modules or the container for the local modules; and dispatching a local event from the local event manager unit to the local modules as the event when a remote event is received from a message consumer unit on the computer processor device, the remote event being generated by one of other applications outside the module container that need to stay synchronized with the local modules;
   transmitting the event from the message producer unit on the computer processor device to a data server as a message configured to communicate the event to the other applications outside the module container that need to stay synchronized with the local modules, when the event is received from the local event manager unit;
   transmitting the remote event from the message consumer unit on the computer processor device to the local event manager unit, when the message consumer unit receives the message configured to communicate the remote event from the data server;
   determining at each of the local modules on the computer processor device to not cache the event for the local module when the local module is active, and to cache the event when the local module is not active, when the local module receives the event from the local event manager unit; and acting on the event at the local module on the computer processor device instead of storing the event for later action, when the determination is to not cache the event; and storing the event in an event cache per the local module for later action, when the determination is to cache the event.

9. The method of claim 8, wherein the local module acts on each event in its event cache using the same action for cached events as for events which were not cached.

10. The method of claim 8, further comprising
transmitting a data event from the message consumer unit to the local event manager unit, when the message consumer unit receives a message configured to communicate the data event from the data server, the data event representing a modification of data at the data server by the one of the other applications outside the module container that need to stay synchronized with the local modules.

11. The method of claim 8, wherein
the local module determines to not cache the event, when the module is in interactive mode on a user interface within the module container; and determines to cache the event, when the module is in a background of the user interface within the module container.

12. The method of claim 8, further comprising
determining in the local module whether any one or more of other events stored in the event cache of the local module is to be overridden by the event, and evicting the one or more of the other events stored in the event cache when the one or more of the other events is to be overridden, when the local module determines to cache the event.

13. The method of claim 8, further comprising
the local module acting on all events stored in the cache for the local module, when a user control event activates the local module within the module container.

14. The method of claim 8, wherein the same application is a web distributed application that supports multiple simultaneous users each operating separate module containers with local modules that are the other applications outside the module container that need to stay synchronized.

15. An apparatus configured to perform the method of claim 8.

16. A non-transitory computer readable medium comprising executable instructions for causing a computer to perform the method of claim 8.

17. A computer-readable non-transitory medium comprising instructions for execution by a computer, the instructions including a computer-implemented method for synchronizing plural independent applications, the instructions comprising:
dispatching, from a local event manager unit in a computer processor device, an event to all of local modules within a same application of a same module container on the computer processor device, and passing the event to a message producer unit in the computer processor device, when the event is received by the local event manager unit from one of the local modules executing within the module container or from the module container to represent a user control action within the one of the local modules or the container for the local modules; and dispatching a local event from the local event manager unit to the local modules as the event when a remote event is received from a message consumer unit on the computer processor device, the remote event being generated by one of other applications outside the module container that need to stay synchronized with the local modules;
transmitting the event from the message producer unit on the computer processor device to a data server as a message configured to communicate the event to the other applications outside the module container that need to stay synchronized with the local modules, when the event is received from the local event manager unit;
transmitting the remote event from the message consumer unit on the computer processor device to the local event manager unit, when the message consumer unit receives the message configured to communicate the remote event from the data server;
determining at each of the local modules on the computer processor device to not cache the event for the local module when the local module is active, and to cache the event when the local module is not active, when the local module receives the event from the local event manager unit; and
acting on the event at the local module on the computer processor device instead of storing the event for later action, when the determination is to not cache the event; and storing the event in an event cache per the local module for later action, when the determination is to cache the event.

18. The computer-readable non-transitory medium of claim 17, wherein the local module acts on each event in its event cache using the same action for cached events as for events which were not cached.

19. The computer-readable non-transitory medium of claim 17, further comprising
transmitting a data event from the message consumer unit to the local event manager unit, when the message consumer unit receives a message configured to communicate the data event from the data server, the data event representing a modification of data at the data server by the one of the other applications outside the module container that need to stay synchronized with the local modules.

20. The computer-readable non-transitory medium of claim 17, wherein
the local module determines to not cache the event, when the module is in interactive mode on a user interface within the module container; and determines to cache the event, when the module is in a background of the user interface within the module container.

21. The computer-readable non-transitory medium of claim 17, further comprising
determining in the local module whether one or more of other events stored in the event cache of the local module is to be overridden by the event, and evicting the one or more of the other events stored in the event cache when the one or more of the other events is to be overridden, when the local module determines to cache the event.

22. The computer-readable non-transitory medium of claim 17, further comprising
the local module acting on all events stored in the cache for the local module, when a user control event activates the local module within the module container.

23. The computer-readable non-transitory medium of claim 17, wherein the same application is a web distributed application that supports multiple simultaneous users each operating separate module containers with local modules that are the other applications outside the module container that need to stay synchronized.

* * * * *